US011895667B2

United States Patent
Sun et al.

(10) Patent No.: US 11,895,667 B2
(45) Date of Patent: Feb. 6, 2024

(54) MULTIPLE FEEDBACK CONTROL FOR GROUP COMMON-PHYSICAL DOWNLINK SHARED CHANNEL (GC-PDSCH) IN MULTIMEDIA BROADCAST MULTICAST SERVICE (MBMS)

(71) Applicant: QUALCOMM Incorporated, San Diego, CA (US)

(72) Inventors: Jing Sun, San Diego, CA (US); Wanshi Chen, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/450,248

(22) Filed: Oct. 7, 2021

(65) Prior Publication Data

US 2022/0116986 A1  Apr. 14, 2022

Related U.S. Application Data

(60) Provisional application No. 63/090,132, filed on Oct. 9, 2020.

(51) Int. Cl.
*H04W 72/23* (2023.01)
*H04L 5/00* (2006.01)
*H04W 72/30* (2023.01)

(52) U.S. Cl.
CPC ........... *H04W 72/23* (2023.01); *H04L 5/0055* (2013.01); *H04W 72/30* (2023.01)

(58) Field of Classification Search
CPC .... H04W 72/23; H04W 72/30; H04L 5/0055; H04L 2001/0093; H04L 1/1887; H04L 1/1854; H04L 1/1896

(Continued)

(56) References Cited

U.S. PATENT DOCUMENTS

2022/0217760 A1* 7/2022 Iyer ........................ H04L 5/0053
2023/0171041 A1* 6/2023 Schober ................. H04L 1/1864
370/329

FOREIGN PATENT DOCUMENTS

WO  WO-2020168223 A1  8/2020

OTHER PUBLICATIONS

Vivo, "Discussion on mechanisms to support group scheduling for RRC_Connected UEs", R1-2005406, Aug. 17-28, 2020. (From Applicant's IDS). (Year: 2020).*

(Continued)

*Primary Examiner* — Mang Hang Yeung

(74) *Attorney, Agent, or Firm* — Kevin M. Donnelly; Norton Rose Fulbright US LLP

(57) ABSTRACT

This disclosure provides systems, methods, and apparatuses, including computer programs encoded on computer storage media, for enabling a wireless system implementing multicast transmissions to control feedback reports from multiple user equipments (UEs) and to address feedback codebook misalignment issues. In particular, aspects provide for multicast transmission grants including multiple feedback timing indicators (K1) in which the multicast transmission grants are configured to configure different UEs for multicast transmission feedback reporting in which feedback codebooks transmitted in various uplink control transmission occasions from the different UEs have a same size. Other aspects and features are also claimed and described.

30 Claims, 10 Drawing Sheets

(58) Field of Classification Search
USPC .......................................................... 370/329
See application file for complete search history.

(56) References Cited

OTHER PUBLICATIONS

International Search Report and Written Opinion—PCT/US2021/071793—ISA/EPO—dated Feb. 8, 2022.

Nokia., et al., "Email Discussion [98-NR-08] on HARQ-ACK Related Issues for MsgB", 3GPP TSG-WG1 Meeting #98bis, 3GPP Draft, R1-1910692 Email Discussion [98-NR-08] on HARQ-ACK, 3rd Generation Partnership Project (3GPP), Mobile Competence Centre, 650, Route Des Lucioles, F-06921 Sophia-Antipolis Cedex, France, vol. TSG-WG1, No. Chongqing, China, Oct. 14, 2019-Oct. 20, 2019, Oct. 22, 2019 (Oct. 22, 2019), pp. 1-18, XP051798600, Retrieved from the Internet: URL: https://ftp.3gpp.org/tsg_ran/WG1_RL1/TSGR1_98b/Docs/R1-1910692.zip, R1-1910692 Email discussion 98-NR-08 MsgB HARQ-ACK.docx [retrieved on Oct. 22, 2019] p. 8-p. 13.

Vivo: "Discussion on Mechanisms to Support Group Scheduling for RRC_Connected UEs", 3GPP TSG RAN WG1 #102-e, 3GPP Draft, R1-2005406, 3rd Generation Partnership Project (3GPP), Mobile Competence Centre, 650, Route Des Lucioles, F-06921 Sophia-Antipolis Cedex, France, vol. RAN WG1, No. e—Meeting, Aug. 17, 2020-Aug. 28, 2020, Aug. 8, 2020 (Aug. 8, 2020), XP051917431, Retrieved from the Internet: URL: https://www.3gpp.org/ftp/tsg_ran/WG1_RL1/TSGR1_102-e/Docs/R1-2005406.zip, R1-2005406—Discussion on mechanisms to support group scheduling for RRC_Connected UEs.docx [retrieved on Aug. 8, 2020] p. 1-p. 3.

\* cited by examiner

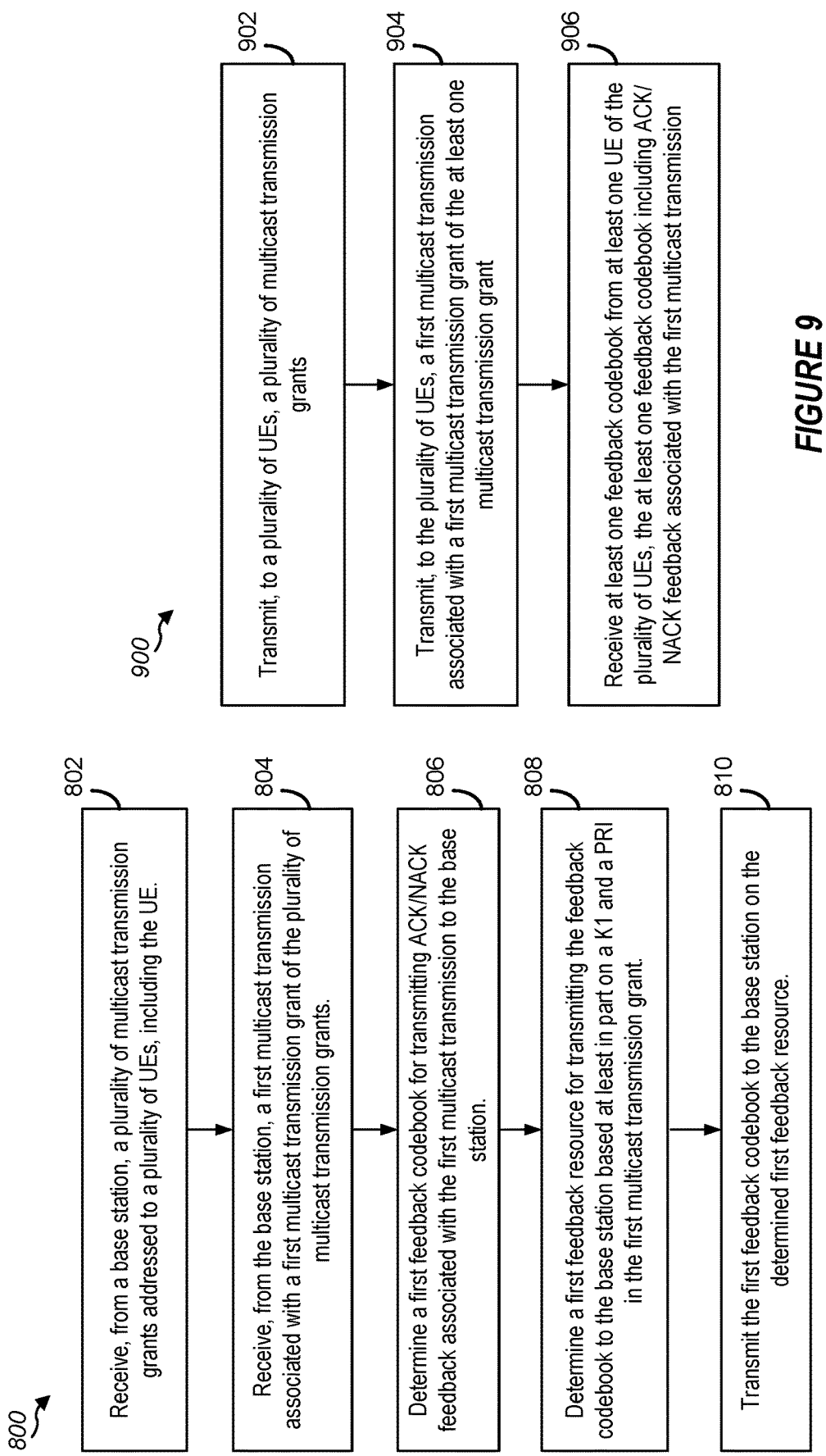

MULTIPLE FEEDBACK CONTROL FOR GROUP COMMON-PHYSICAL DOWNLINK SHARED CHANNEL (GC-PDSCH) IN MULTIMEDIA BROADCAST MULTICAST SERVICE (MBMS)

CROSS-REFERENCE TO RELATED APPLICATIONS

This application claims the benefit of U.S. Provisional Patent Application No. 63/090,132, entitled, "MULTIPLE FEEDBACK CONTROL FOR GROUP COMMON-PHYSICAL DOWNLINK SHARED CHANNEL (GC-PDSCH) IN MULTIMEDIA BROADCAST MULTICAST SERVICE (MBMS)," filed on Oct. 9, 2020, which is expressly incorporated by reference herein in its entirety.

TECHNICAL FIELD

Aspects of the present disclosure relate generally to wireless communication systems, and more particularly, to control of feedback from multiple user equipments (UEs) to a base station for group common-physical downlink shared channel (GC-PDSCH) transmissions in multimedia broadcast multicast service (MBMS).

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

In current multimedia broadcast multicast service (MBMS) systems, a base station may be configured to transmit broadcast or multicast messages to a plurality of UEs. In these current systems, a base station may address a single multicast transmission to a group of user equipments (UEs). The group of UEs may receive the multicast transmission, and may be configured to provide feedback associated with the transmission. In particular, in examples of MBMS systems, a base station may transmit multiple group common-physical downlink control channel (GC-PDCCH) transmissions, which may be respectively addressed to the group of UEs. In such examples, the base station may configure each of the GC-PDCCH transmissions to include a grant of a respective GC-physical downlink shared channel (GC-PDSCH) transmission. It is noted that in the present description, a GC-PDCCH transmission including a grant of a GC-PDSCH transmission may be referred to as a GC-PDCCH transmission grant. In such examples, each GC-PDCCH transmission grant transmitted by the base station may include a feedback timing indicator (K1) and a physical uplink control channel (PUCCH) resource indicator (PRI). A UE receiving a GC-PDCCH transmission grant may use the included K1 and PRI to determine a resource for providing acknowledgement/negative-acknowledgement (ACK/NACK) feedback for a GC-PDSCH transmission associated with the GC-PDCCH transmission grant.

Some examples of MBMS systems may support UE-specific feedback for MBMS transmissions. For example, following the example above, after receiving a GC-PDSCH transmission from a base station, a UE may provide feedback to the base station indicating a NACK for the GC-PDSCH transmission. In such an example, the base station may retransmit (or schedule to retransmit) the GC-PDSCH transmission for which the NACK was provided by the UE. In this example, the base station may address the GC-PDSCH retransmission specifically to the UE that reported the NACK feedback.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method for wireless communication performed by a user equipment (UE). The method includes receiving, from a base station, a plurality of multicast transmission grants addressed to a plurality of UEs, including the UE. Each of the multicast transmission grants schedules a multicast transmission and includes at least one feedback timing indicator (K1) and at least one physical uplink control channel (PUCCH) resource indicator (PRI) for acknowledgement/negative-acknowledgement (ACK/NACK) feedback associated with a respective multicast transmission. The method also includes receiving, from the base station, a first multicast transmission associated with a first multicast transmission grant of the plurality of multicast transmission grants. The method also includes transmitting a first feedback codebook to the base station on a first feedback resource. In aspects, the first feedback resource is determined by the UE based, at least in part, on the at least one K1 and the at least one PRI in the first multicast transmission grant, and the first feedback codebook is configured for transmitting ACK/NACK feedback associated with the first multicast transmission to the base station.

Another innovative aspect of the subject matter described in this disclosure can be implemented in a UE. The UE includes at least one processor and a memory coupled with the at least one processor and storing processor-readable instructions that, when executed by the at least one processor, is configured to receive, from a base station, a plurality of multicast transmission grants addressed to a plurality of UEs, including the UE. Each of the multicast transmission grants schedules a multicast transmission and includes at least one K1 and at least one PRI for ACK/NACK feedback associated with a respective multicast transmission. The at least one processor is also configured to receive, from the base station, a first multicast transmission associated with a first multicast transmission grant of the plurality of multicast transmission grants. The at least one processor is also configured to transmit a first feedback codebook to the base station on a first feedback resource. In aspects, the first feedback resource is determined by the UE based, at least in part, on the at least one K1 and the at least one PRI in the first multicast transmission grant, and the first feedback codebook is configured for transmitting ACK/NACK feedback associated with the first multicast transmission to the base station.

Another innovative aspect of the subject matter described in this disclosure can be implemented in an apparatus configured for wireless communication. The apparatus includes means for receiving, by a UE from a base station, a plurality of multicast transmission grants addressed to a plurality of UEs, including the UE. Each of the multicast transmission grants schedules a multicast transmission and includes at least one K1 and at least one PRI for ACK/NACK feedback associated with a respective multicast transmission. The apparatus includes means for receiving, from the base station, a first multicast transmission associated with a first multicast transmission grant of the plurality of multicast transmission grants. The apparatus includes means for transmitting a first feedback codebook to the base station on a first feedback resource. In aspects, the first feedback resource is determined by the UE based, at least in part, on the at least one K1 and the at least one PRI in the first multicast transmission grant, and the first feedback codebook is configured for transmitting ACK/NACK feedback associated with the first multicast transmission to the base station.

Another innovative aspect of the subject matter described in this disclosure can be implemented in a non-transitory computer-readable medium storing instructions that, when executed by a processor, cause the processor to perform operations including receiving, by a UE from a base station, a plurality of multicast transmission grants addressed to a plurality of UEs, including the UE. Each of the multicast transmission grants schedules a multicast transmission and includes at least one K1 and at least one PRI for ACK/NACK feedback associated with a respective multicast transmission. The operations also include receiving, from the base station, a first multicast transmission associated with a first multicast transmission grant of the plurality of multicast transmission grants. The operations also include transmitting a first feedback codebook to the base station on a first feedback resource. In aspects, the first feedback resource is determined by the UE based, at least in part, on the at least one K1 and the at least one PRI in the first multicast transmission grant, and the first feedback codebook is configured for transmitting ACK/NACK feedback associated with the first multicast transmission to the base station.

Another innovative aspect of the subject matter described in this disclosure can be implemented in a method for wireless communication performed by a base station. The method includes transmitting, to a plurality of UEs, a plurality of multicast transmission grants. Each of the multicast transmission grants schedules a multicast transmission and includes at least one K1 and at least one PRI for ACK/NACK feedback associated with a respective multicast transmission. The method also includes transmitting, to the plurality of UEs, a first multicast transmission associated with a first multicast transmission grant of the at least one multicast transmission grant, and receiving at least one feedback codebook from at least one UE of the plurality of UEs. The at least one feedback codebook includes ACK/NACK feedback associated with the first multicast transmission.

Another innovative aspect of the subject matter described in this disclosure can be implemented in a base station. The base station includes at least one processor and a memory coupled with the at least one processor and storing processor-readable code that, when executed by the at least one processor, is configured to transmit, to a plurality of UEs, a plurality of multicast transmission grants. Each of the multicast transmission grants schedules a multicast transmission and includes at least one K1 and at least one PRI for ACK/NACK feedback associated with a respective multicast transmission. The at least one processor is also configured to transmit, to the plurality of UEs, a first multicast transmission associated with a first multicast transmission grant of the at least one multicast transmission grant, and to receive at least one feedback codebook from at least one UE of the plurality of UEs. The at least one feedback codebook includes ACK/NACK feedback associated with the first multicast transmission.

Another innovative aspect of the subject matter described in this disclosure can be implemented in an apparatus configured for wireless communication. The apparatus includes means for transmitting, from a base station to a plurality of UEs, a plurality of multicast transmission grants. Each of the multicast transmission grants schedules a multicast transmission and includes at least one K1 and at least one PRI for ACK/NACK feedback associated with a respective multicast transmission. The method also includes transmitting, to the plurality of UEs, a first multicast transmission associated with a first multicast transmission grant of the at least one multicast transmission grant, and receiving at least one feedback codebook from at least one UE of the plurality of UEs. The at least one feedback codebook includes ACK/NACK feedback associated with the first multicast transmission.

Another innovative aspect of the subject matter described in this disclosure can be implemented in a non-transitory computer-readable medium storing instructions that, when executed by a processor, cause the processor to perform operations including transmitting, from a base station to a plurality of UEs, a plurality of multicast transmission grants. Each of the multicast transmission grants schedules a multicast transmission and includes at least one K1 and at least one PRI for ACK/NACK feedback associated with a respective multicast transmission. The operations also include transmitting, to the plurality of UEs, a first multicast transmission associated with a first multicast transmission grant of the at least one multicast transmission grant, and receiving at least one feedback codebook from at least one UE of the plurality of UEs. The at least one feedback codebook includes ACK/NACK feedback associated with the first multicast transmission.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8 is a flow diagram illustrating an example process that supports reporting of feedback for multicast transmissions according to some aspects of the present disclosure.

FIG. 9 is a flow diagram illustrating an example process that supports management and control of feedback for multicast transmissions based on configuration of K1s and PRIs according to some aspects of the present disclosure.

Like reference numbers and designations in the various drawings indicate like elements.

DETAILED DESCRIPTION

Figure 1:
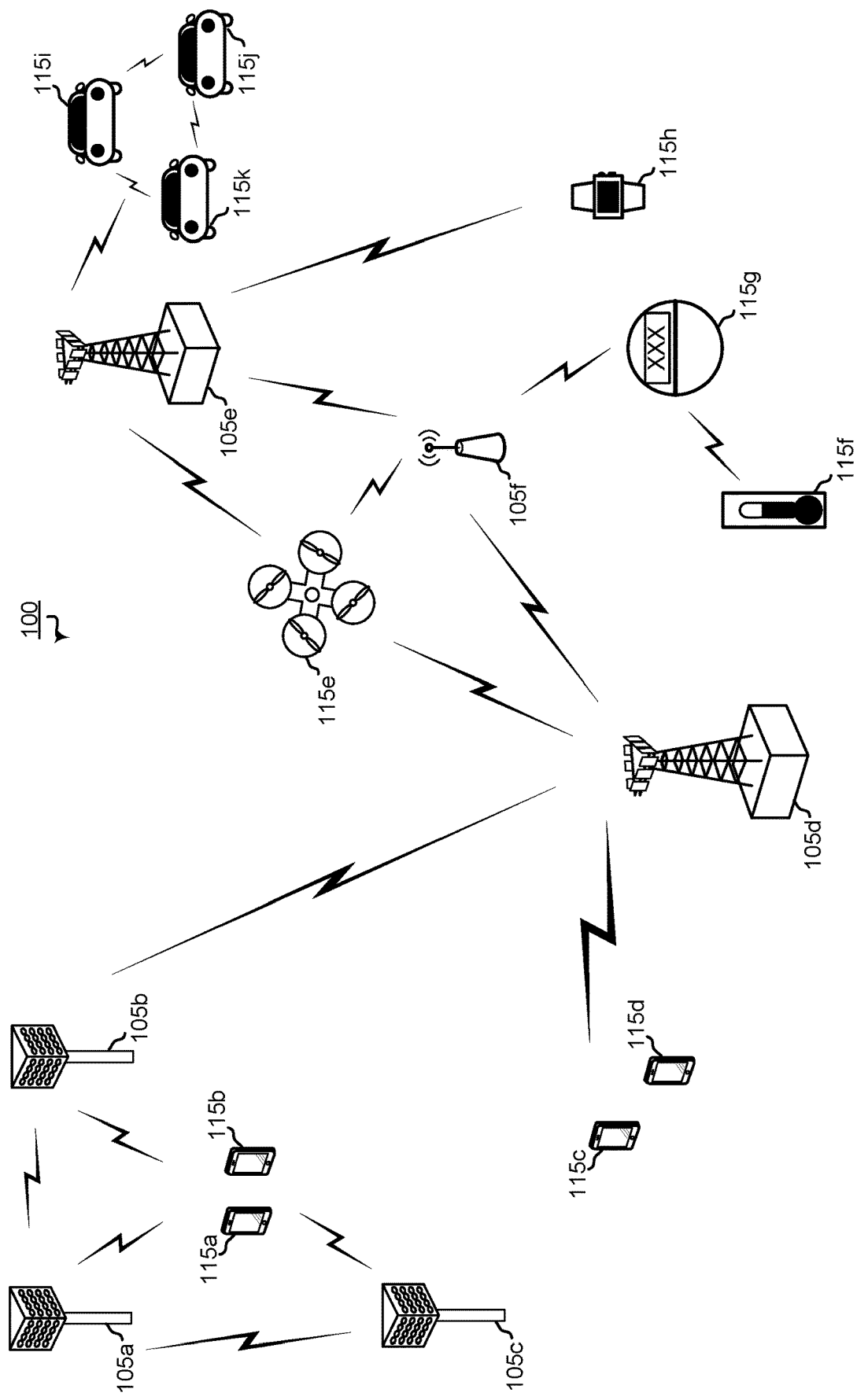
FIG. 1 is a block diagram illustrating details of an example wireless communication system.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Current wireless communication systems suffer a feedback codebook misalignment problem that is associated with current use of multiple feedback timing indicators (K1s) in group common (GC)-physical downlink control channel (GC-PDCCH) transmission grants in which feedback codebooks reported from different UEs in a physical uplink control channel (PUCCH) occasion have different sizes due to the use of multiple K1s.

Various aspects disclosed herein relate generally to management and control of feedback reporting associated with broadcast or multicast transmissions. Some aspects of the present disclosure more specifically relate to enabling the reporting of feedback from a group of UEs to a base station for group common (GC)-physical downlink shared channel (GC-PDSCH) transmissions associated with a multimedia broadcast multicast service (MBMS). In some examples, a base station may schedule and transmit GC-physical downlink control channel (GC-PDCCH) transmission grants that schedule respective GC-PDSCH transmissions and that also include feedback control information that a UE or a set of UEs of a group of UEs receiving GC-PDSCH transmission may use to determine a respective feedback resource in which to report a feedback codebook for the GC-PDSCH transmission. For example, a base station may transmit a GC-PDCCH transmission grant to a group of UEs that includes a common K1 and multiple, different physical uplink control channel (PUCCH) resource indicators (PRIs), each PRI being associated with a respective UE of the set of UEs. Each UE in the set of UEs may use the common K1 indicator to determine a same time, such as within a slot or a sub-slot, and may use its respective PRI to determine a PUCCH resource within the slot or sub-slot for reporting its feedback codebook.

Additionally or alternatively, a base station may transmit a GC-PDCCH transmission grant to the group of UEs that includes an indication of one or more scheduling restrictions which limit feedback reporting from various ones of the group of UEs such that the feedback codebooks reported by the UEs in a PUCCH occasion each have the same size. In some examples, the base station may configure a scheduling restriction by indicating different respective K1s to the different UEs in the group of UEs to ensure that, for a given PUCCH occasion, the different UEs report feedback for a same number of GC-PDSCH transmissions. In some other examples, each UE may be configured with a relative K1 that the UE may add to the K1 indicated by the base station in the GC-PDCCH transmission grant to obtain a total K1. In such examples, each UE may use its respective total K1 to determine a feedback resource in which to report a feedback codebook for the GC-PDSCH transmission associated with the GC-PDCCH transmission grant.

Particular implementations of the subject matter described in this disclosure can be implemented to realize one or more of the following potential advantages. In some aspects, the techniques described herein enable reporting of feedback from a group of UEs to a base station such that the feedback codebooks reported by different UEs in a PUCCH occasion have the same size. In such aspects, the base station may transmit GC-PDCCH transmission grants that include a K1 field, or multiple K1 fields, while ensuring that feedback codebooks reported from the different UEs in a PUCCH occasion have the same size. In addition, the techniques described herein enable a base station to distribute feedback reporting associated with GC-physical downlink shared channel (GC-PDSCH) transmissions among multiple UEs over time in a fixed relative pattern by providing a mechanism to ensure that the feedback codebooks reported by different UEs in a PUCCH occasion have the same size. These techniques offer the advantage that the control overhead of PUCCH transmissions may also be distributed over time.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1 M nodes per km2), ultra-low complexity (such as ~10s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
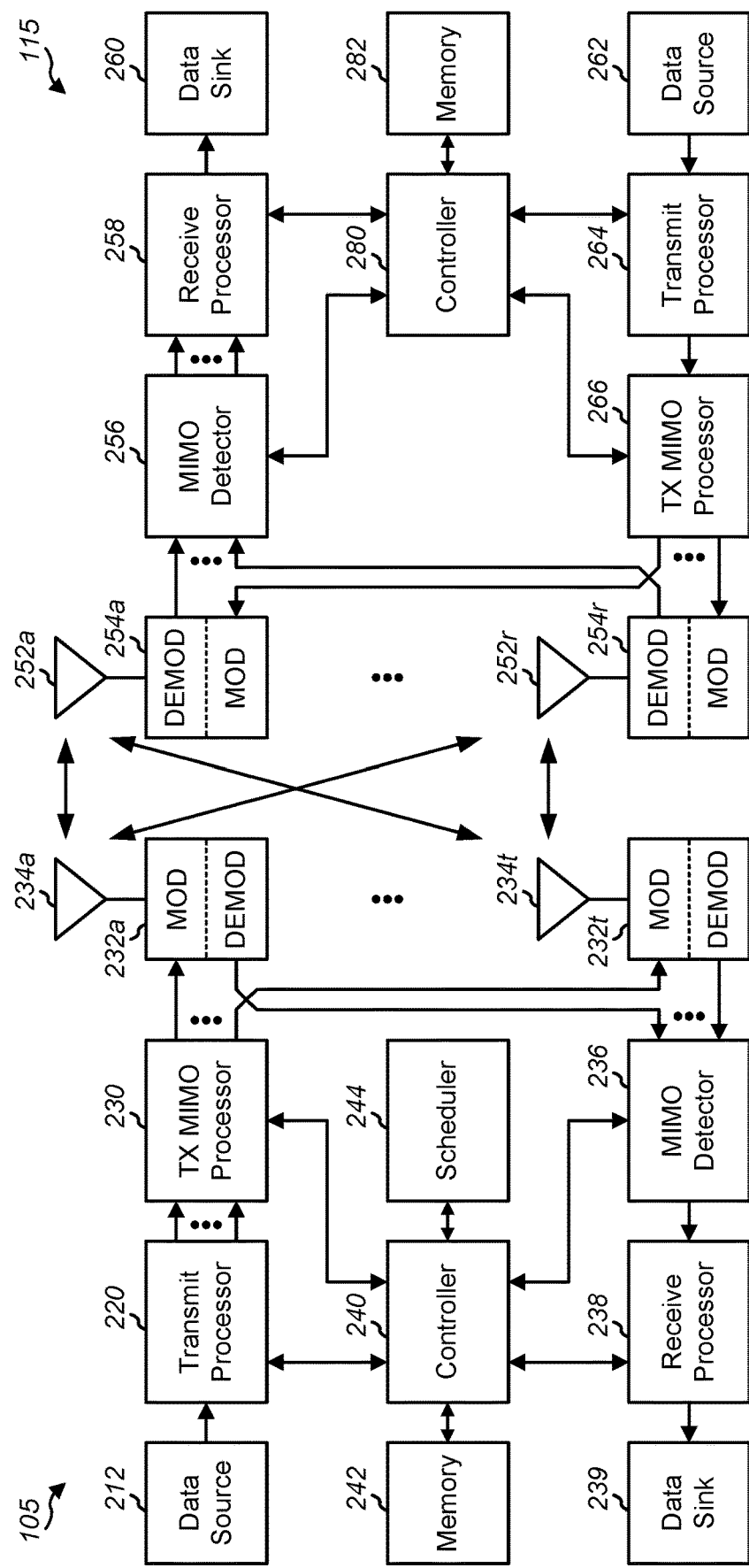
FIG. 2 is a block diagram conceptually illustrating an example design of a base station and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 8 and 9, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

In examples of multimedia broadcast multicast service (MBMS) systems, a base station may indicate multiple K1 s and PRIs in different fields of a GC-PDCCH transmission grant. In these example systems, each UE receiving the GC-PDCCH transmission may be configured to monitor one of the multiple K1 and PRI fields. In some examples, multiple UEs may be configured to monitor the same K1 and PRI fields, but may be further configured to interpret a same PRI in the PRI field differently. In such examples, the multiple UEs configured to monitor the same PRI field but interpret the PRI differently may determine different feedback resources, such as PUCCH resources, in which to report the feedback codebook for the GC-PDSCH transmission granted in the GC-PDCCH transmission grant. However, in these example systems, indicating multiple K1 s and PRIs creates a feedback codebook misalignment problem. For example, as different UEs may report feedback codebooks for different GC-PDSCH transmissions in a same PUCCH occasion, the feedback codebooks reported by the different UEs may have a different size.

Various aspects disclosed herein relate generally to management and control of feedback reporting associated with broadcast or multicast transmissions. Some aspects of the present disclosure more specifically relate to enabling the reporting of feedback from a group of UEs to a base station, for group common (GC)-physical downlink shared channel (GC-PDSCH) transmissions associated with a multimedia broadcast multicast service (MBMS). In some examples, a base station may schedule and transmit GC-physical downlink control channel (GC-PDCCH) transmission grants that schedule respective GC-PDSCH transmissions and that also include feedback control information that a UE or a set of UEs of a group of UEs receiving a GC-PDSCH transmission may use to determine a respective feedback resource in which to report a feedback codebook for the GC-PDSCH transmission. For example, a base station may transmit a GC-PDCCH transmission grant to a group of UEs that includes a common feedback timing indicator (K1) and multiple, different physical uplink control channel (PUCCH) resource indicators (PRIs), each PRI being associated with a respective UE of the set of UEs. Each UE in the set of UEs may use the common K1 indicator to determine a same time, such as within a slot or a sub-slot, and may use its respective PRI to determine a PUCCH resource within the slot or sub-slot for reporting its feedback codebook.

Additionally or alternatively, a base station may transmit a GC-PDCCH transmission grant to the group of UEs that includes an indication of one or more scheduling restrictions which limit feedback reporting from various ones of the group of UEs such that the feedback codebooks reported by the UEs in a PUCCH occasion each have the same size. In some examples, the base station may configure a scheduling restriction by indicating different respective K1s to the different UEs in the group of UEs to ensure that, for a given PUCCH occasion, the different UEs report feedback for a same number of GC-PDSCH transmissions. In some other examples, each UE may be configured with a relative K1 that the UE may add to the K1 indicated by the base station in the GC-PDCCH transmission grant to obtain a total K1. In such examples, each UE may use its respective total K1 to determine a feedback resource in which to report a feedback codebook for the GC-PDSCH transmission associated with the GC-PDCCH transmission grant.

Particular implementations of the subject matter described in this disclosure can be implemented to realize one or more of the following potential advantages. In some aspects, the techniques described herein enable reporting of feedback from a group of UEs to a base station such that the feedback codebooks reported by different UEs in a PUCCH occasion have the same size. In such aspects, the base station may transmit GC-PDCCH transmission grants that include a K1 field, or multiple K1 fields, while ensuring that feedback codebooks reported from the different UEs in a PUCCH occasion have the same size.

Figure 3:
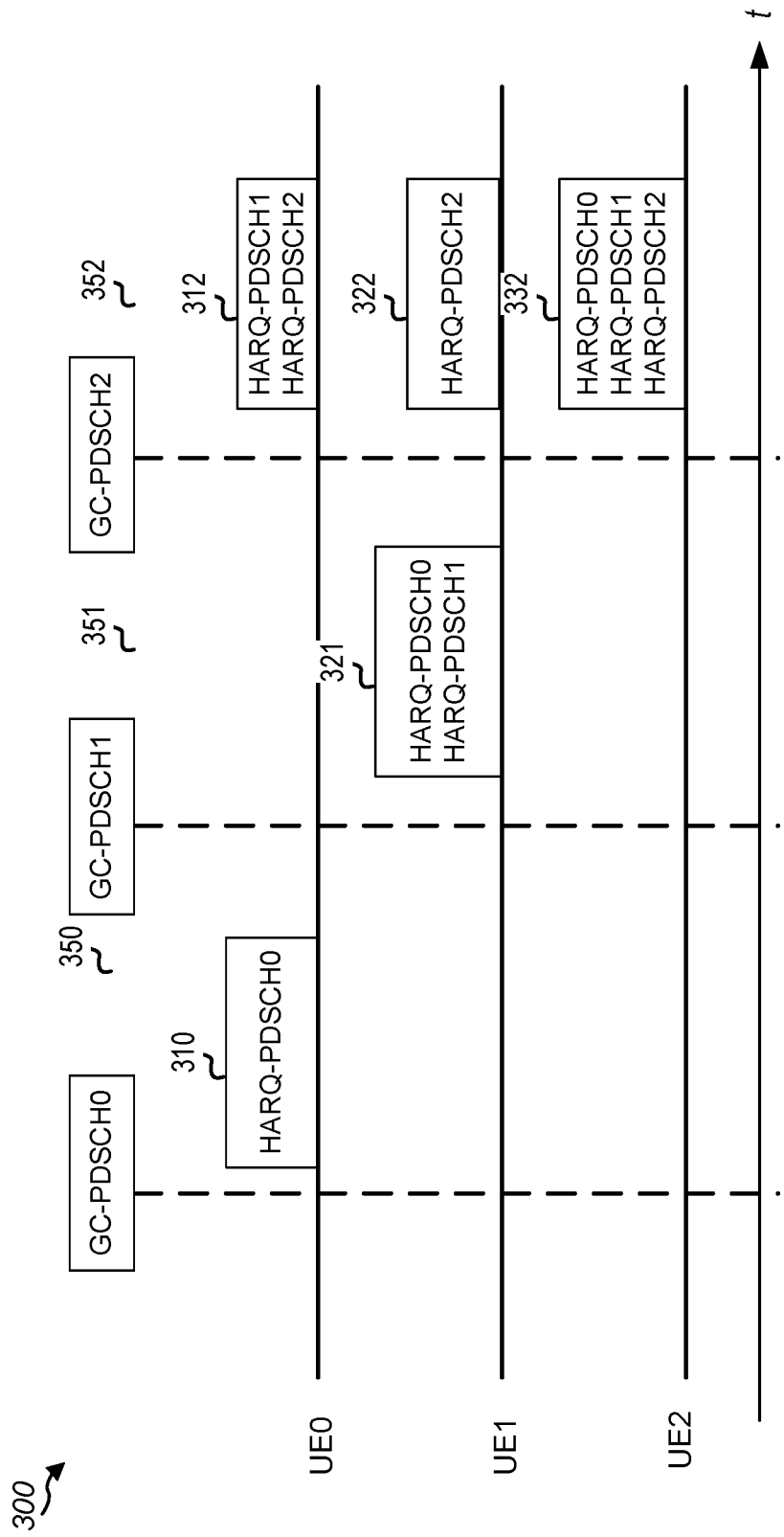
FIG. 3 is a timing diagram illustrating an example of reporting feedback for multicast transmissions associated with multicast transmission grants that include multiple feedback timing indicator (K1) fields and multiple physical uplink control channel (PUCCH) resource indicator (PRI) fields.

FIG. 3 is a timing diagram illustrating an example of reporting feedback for multicast transmissions associated with multicast transmission grants that include multiple K1 fields and multiple PRI fields. In particular, UE0-UE2 may receive a plurality of multicast transmissions at various times. For example, a plurality of multicast GC-PDSCH (GC-PDSCH0-GC-PDSCH2) transmissions may be transmitted from a base station. In this example, the base station may address the GC-PDSCH transmissions (GC-PDSCH0-GC-PDSCH2) to UE0-UE2. In this example, each of UE0-UE2 may generate a feedback codebook to report feedback for each of those GC-PDSCH transmissions (GC-PDSCH0-GC-PDSCH2). However, in this example, the base station may have indicated different K1s and PRIs in different fields of the GC-PDCCH transmission grants associated with each of GC-PDSCH0-GC-PDSCH2. In such example, each of UE0-UE2 may be configured to monitor a different K1 field, in which case each of UE0-UE2 may report feedback codebooks to the base station at different time and on different resources, according to respectively indicated K1 and PRI. For example, UE0 may generate a feedback report for the GC-PDSCH0 transmission and may be configured (such as by the K1 and PRI indications in the GC-PDCCH transmission granting the GC-PDSCH0 transmission) to report the feedback codebook for GC-PDSCH0 in the PUCCH transmitted at 350 from UE0 to the base station. In this case, the feedback codebook reported by UE0 at 350 includes ACK/NACK information for one GC-PDSCH transmission. However, UE0 may also generate a feedback report for the GC-PDSCH1 and the GC-PDSCH1 transmissions, and may be configured (such as by the K1 and PRI indications in the GC-PDCCH transmissions granting the GC-PDSCH1 and the GC-PDSCH2 transmissions) to report the feedback codebook for GC-PDSCH1 and GC-PDSCH2, together, in the PUCCH transmitted at 352. In this case, the feedback codebook reported by UE0 at 352 may include ACK/NACK information for two GC-PDSCH transmissions, rather than one. In this example, UE1 reports a feedback codebook that includes ACK/NACK information for two GC-PDSCH transmissions (such as GC-PDSCH0 and the GC-PDSCH1) in the PUCCH transmitted at 351, and reports a feedback codebook that includes ACK/NACK information for one GC-PDSCH transmission (such as GC-PDSCH2) in the PUCCH transmitted at 352. In this example, UE2 reports a feedback codebook that includes ACK/NACK information for three GC-PDSCH transmissions (such as GC-PDSCH0-GC-PDSCH2) in the PUCCH transmitted at 352.

Thus, as can be seen from the example illustrated in FIG. 3, due to signaling multiple K1 and PRI values to different UEs, the UEs may report feedback codebooks of different sizes in the various PUCCH occasions from the different UEs. Because the size of the feedback codebooks reported by the various UEs, managing a counter downlink assignment index (DAI) in for the GC-PDCCH transmission grants becomes very difficult.

Figure 4:
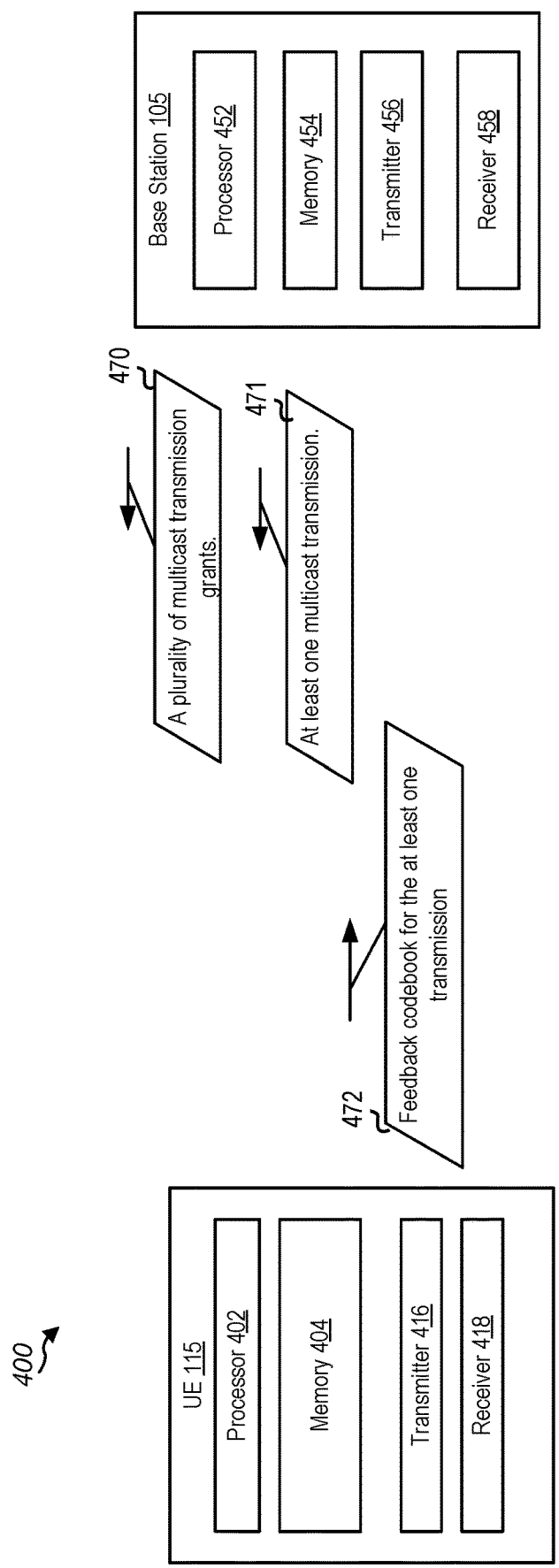
FIG. 4 is a diagram illustrating an example communication flow between a UE and a base station that enables management and control of the reporting of multicast transmission feedback according to some aspects of the present disclosure.

FIG. 4 is a diagram illustrating an example communication flow 400 between a UE and a base station that enables management and control of the reporting of multicast transmission feedback according to some aspects of the present disclosure. In some examples, the wireless communications system 400 may implement aspects of the wireless network 100. The wireless communications system 300 includes the UE 115 and the base station 105. Although one UE 115 and one base station 105 are illustrated, in some other implementations, the wireless communications system 400 may generally include multiple UEs 115, and may include more than one base station 105.

The UE 115 can include a variety of components (such as structural, hardware components) used for carrying out one or more functions described herein. For example, these components can include one or more processors 402 (hereinafter referred to collectively as "the processor 402"), one or more memory devices 404 (hereinafter referred to collectively as "the memory 404"), one or more transmitters 416 (hereinafter referred to collectively as "the transmitter 416"), and one or more receivers 418 (hereinafter referred to collectively as "the receiver 418"). The processor 402 may be configured to execute instructions stored in the memory 404 to perform the operations described herein. In some implementations, the processor 402 includes or corresponds to one or more of the receive processor 258, the transmit processor 264, and the controller 280, and the memory 404 includes or corresponds to the memory 282.

The transmitter 416 is configured to transmit reference signals, control information and data to one or more other devices, and the receiver 418 is configured to receive references signals, synchronization signals, control information and data from one or more other devices. For example, the transmitter 416 may transmit signaling, control information and data to, and the receiver 418 may receive signaling, control information and data from, the base station 105. In some implementations, the transmitter 416 and the receiver 418 may be integrated in one or more transceivers. Additionally or alternatively, the transmitter 416 or the receiver 418 may include or correspond to one or more components of the UE 115 described with reference to FIG. 2.

The base station 105 can include a variety of components (such as structural, hardware components) used for carrying out one or more functions described herein. For example, these components can include one or more processors 452 (hereinafter referred to collectively as "the processor 452"), one or more memory devices 454 (hereinafter referred to collectively as "the memory 454"), one or more transmitters 456 (hereinafter referred to collectively as "the transmitter 456"), and one or more receivers 458 (hereinafter referred to collectively as "the receiver 458"). The processor 452 may be configured to execute instructions stored in the memory 454 to perform the operations described herein. In some implementations, the processor 452 includes or corresponds to one or more of the receive processor 238, the transmit processor 220, and the controller 240, and the memory 454 includes or corresponds to the memory 242.

The transmitter 456 is configured to transmit reference signals, synchronization signals, control information and data to one or more other devices, and the receiver 458 is configured to receive reference signals, control information and data from one or more other devices. For example, the transmitter 456 may transmit signaling, control information and data to, and the receiver 458 may receive signaling, control information and data from, the UE 115. In some implementations, the transmitter 456 and the receiver 458 may be integrated in one or more transceivers. Additionally or alternatively, the transmitter 456 or the receiver 458 may include or correspond to one or more components of base station 105 described with reference to FIG. 2.

In some implementations, the wireless communications system 400 implements a 5G New Radio (NR) network. For example, the wireless communications system 400 may include multiple 5G-capable UEs 115 and multiple 5G-capable base stations 105, such as UEs and base stations configured to operate in accordance with a 5G NR network protocol such as that defined by the 3GPP.

During operation of the wireless communications system 400, base station 105 may transmit a message 470 plurality of multicast transmission grants. For example, base station 105 may transmit multiple GC-PDCCH transmissions, and each GC-PDCCH transmission may grant an associated GC-PDSCH transmission. In aspects, the base station 105 may address the GC-PDCCH transmission grants (and the associated GC-PDSCH transmissions) to a plurality of UEs, which may include UE 115. The base station 105 may configure the GC-PDCCH transmission grants to include configuration and parameters for the associated GC-PDSCH transmissions. For example, the GC-PDCCH transmissions may specify the resources in which the GC-PDSCH transmissions may be received by the UE, and may also specify and define parameters for feedback reporting. As discussed above, in some implementation, the GC-PDCCH transmission grant may include at least one K1 in each GC-PDCCH transmission grant. In some implementations, each GC-PDCCH transmission grant may include multiple K1 fields. In these implementations, the different UEs in the plurality of UEs to which the GC-PDCCH transmission grant is addressed may be configured to monitor different K1 fields.

In some embodiments, as will be discussed in more detail below, each GC-PDCCH transmission grant may include a common K1 that may be used by each UE in the plurality of UEs to determine a timing resource in which to report a feedback codebook for the GC-PDSCH transmission associated with the GC-PDCCH transmission. In these embodiments, although the GC-PDCCH transmission grant may specify a common K1, the GC-PDCCH transmission grant may include multiple PRI fields, each PRI field specifying a different PRI for each UE in the plurality of UEs. In this case, a UE (such as UE 115) may use the common K1 to determine a slot and/or subslot for reporting the feedback codebook associated with the granted GC-PDSCH transmission, and may use the respective PRI to determine a resource within the slot/sub-slot in which to report the feedback codebook.

In some embodiments, as will be discussed in more detail below, both the K1 and PRI in the GC-PDCCH transmission grant may be allowed to be different (instead of a common K1) for the different UEs in the plurality of UEs. However, in these embodiments, the base station may configure the GC-PDCCH transmission grant to specify a scheduling restriction for the feedback reporting that may limit the feedback codebooks reported by the different UEs, based on the different K1s, to the same composition and/or size. In these embodiments, the base station may signal a K1 for each of the different UEs such that the scheduling restriction is enforced. For example, the base station (such as base station 105) may transmit multiple GC-PDCCH transmission grants, each grant granting a GC-PDSCH transmission to a plurality of UEs. In each GC-PDCCH transmission grant, the base station may signal a different K1 indication to the UEs in the plurality of UEs. The UEs in the plurality of UEs may use the different K1 to determine a feedback report timing, such as a PUCCH occasion, for reporting feedback codebooks associated with the granted GC-PDSCH transmissions. For example, a first UE may use a K1 indication in a first GC-PDCCH transmission grant and a K1 indication in a second GC-PDCCH transmission grant to determine a PUCCH occasion to report feedback codebooks for the GC-PDSCH transmissions associated with the first and second GC-PDCCH transmission grants. In this example, a second UE may use a K1 indication in the first GC-PDCCH transmission grant and the K1 indication in a second GC-PDCCH transmission grant to determine a PUCCH occasion to report feedback codebooks for the GC-PDSCH transmissions associated with the first and second GC-PDCCH transmission grants. In this example, based on the scheduling restriction configured by the base station, the composition and/or size of the feedback codebooks reported by the first UE and the feedback codebooks reported by the second UE may be the same. For example, the K1s indicated by the base station may limit the feedback codebook from the first UE to include a feedback report (such as ACK/NACK) for the first GC-PDSCH transmission only. In this case, the K1s indicated by the base station may limit the feedback codebook from the second UE to also only include a feedback report for a single GC-PDSCH transmission (such as the first GC-PDSCH transmission). On the other hand, the K1s indicated by the base station may result in the feedback codebook from the first UE to include a feedback report for both the first GC-PDSCH transmission and the second GC-PDSCH transmission. In this case, the K1s indicated by the base station may result in the feedback codebook from the second UE to also include a feedback report for both the first GC-PDSCH transmission and the second GC-PDSCH transmission.

In some embodiments, the scheduling restriction discussed above may be implemented by configuring the UEs in the plurality of UEs with a relative K1. In embodiments, the relative K1 for a UE may be specific to the UE, and may be a fixed value. In embodiments, the relative K1 of different UEs may be different. In embodiments, a UE may add the relative K1 value to the K1 value indicated by a base station (such as base station 105) in a GC-PDCCH transmission grant. A UE (such as UE 115) may use the total K1 value (such as the indicated K1 plus the relative K1) to determine a resource in PUCCH transmission in which to report the feedback codebook for a GC-PDSCH transmission associated with the GC-PDCCH transmission grant. In embodiments, the relative K1 may provide a way to distribute the feedback reporting associated with GC-PDSCH transmissions over time in a fixed relative pattern. Under this approach, a base station may signal different K1 values in a multicast transmission grant to the plurality of UEs, but for each UE, a feedback codebook for each PUCCH occasion may be the same. In these implementations, the configuration of the UEs including the relative K1 ensures that for each PUCCH occasion, the codebook size of the different UEs reporting feedback may be the same.

During operations, the base station 105 may transmit a message 471 that may include at least one multicast transmission associated with at least one multicast transmission grant of the plurality of multicast transmission grants. As noted above, the base station may transmit a transmit a GC-PDSCH transmission granted in each of the multiple GC-PDCCH transmission grants. In embodiments, the plurality of UEs, including UE 115 may receive the GC-PDSCH transmissions.

During operations, the UE 115 may transmit a message 472 that may include a feedback codebook for the GC-PDSCH transmissions transmitted by base station 105. In embodiments, as discussed above, the feedback codebook may include feedback (such as ACK/NACK feedback) information for the GC-PDSCH transmissions transmitted by base station 105. In embodiments, the feedback codebook may include feedback information for one or more GC-PDSCH transmissions.

In embodiments, the UE 115 may determine a resource in which to transmit the feedback codebook to the base station. Determining the resource in which to transmit the feedback codebook for a GC-PDSCH transmission to the base station may be based on a K1 and PRI indicated in the GC-PDCCH transmission grant associated with the GC-PDSCH transmission, as described above. In some embodiments of the present disclosure, a base station may signal a common K1, as described above. In some embodiments, a base station may signal different K1 values to the different UEs, but the base station may configure a scheduling restriction such that the feedback codebook transmitted by a UE in a PUCCH occasion is the same as a feedback codebook transmitted by each UE in the plurality of UEs in the same PUCCH occasion. In some embodiments, the UE 115 may be configured with a fixed relative K1. The relative K1 of the UE 115 may be added to the K1 indicated in the GC-PDCCH transmission grant, and the total K1 value may be used to determine the resource in the PUCCH in which to transmit the feedback codebook.

Figure 5:
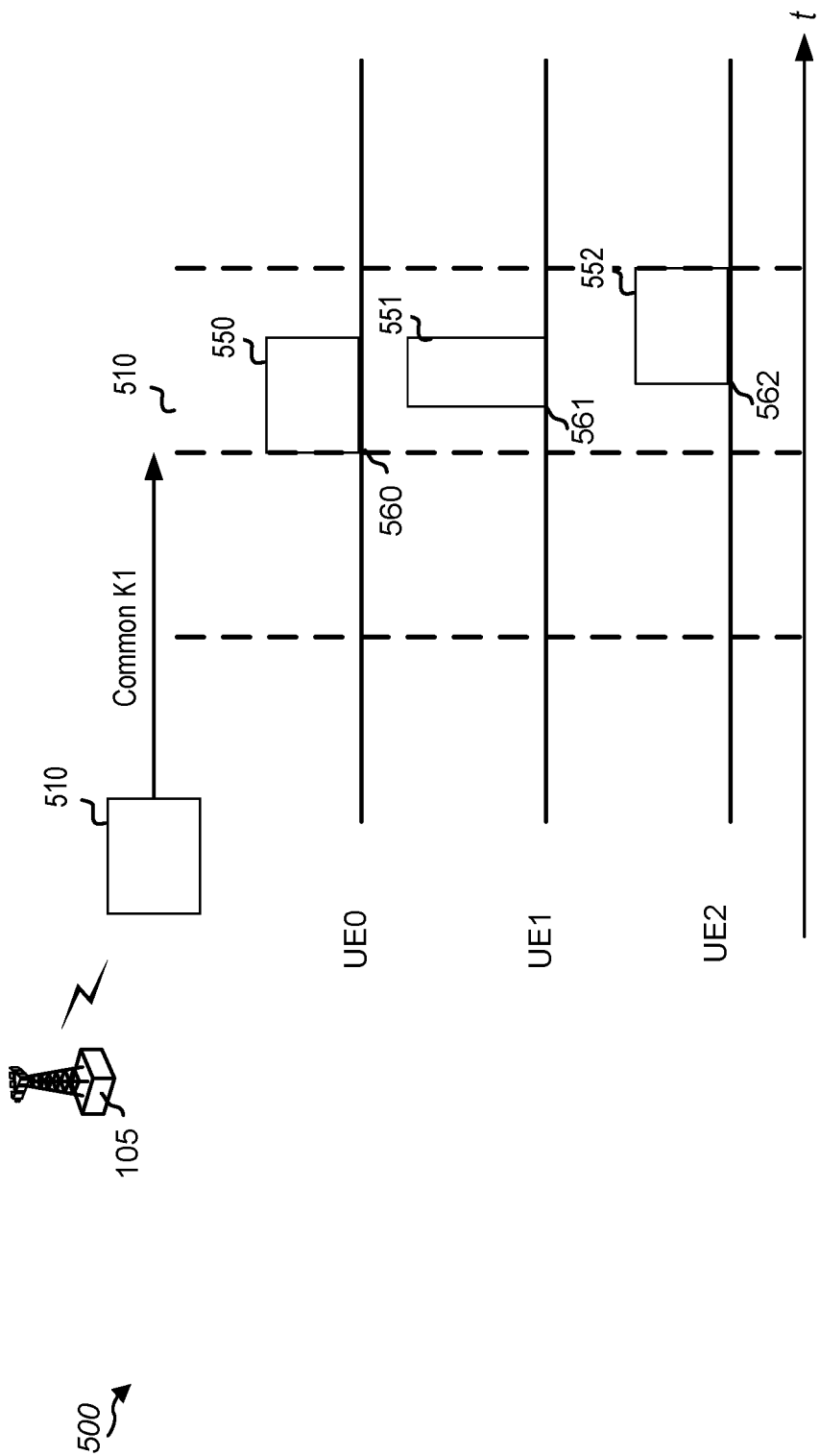
FIG. 5 is a timing diagram illustrating an example of reporting feedback for multicast transmissions associated with multicast transmission grants that include a common K1 and multiple PRIs according to some aspects of the present disclosure.

FIG. 5 is a timing diagram 500 illustrating an example of feedback transmissions for multicast transmissions associated with multicast transmission grants that include a common K1 and multiple PRIs according to some aspects of the present disclosure. As illustrated, a base station (such as base station 105) may transmit a plurality of multicast transmission grants. For example, the base station 105 may transmit multiple GC-PDCCH transmissions, with each GC-PDCCH transmission granting a GC-PDSCH transmission. In embodiments, the base station 105 may configure the GC-PDCCH transmission grants with control information (such as a downlink control information (DCI) message) that includes a common K1. In embodiments, the common K1 may be a value in a field in each of the GC-PDCCH transmission grants. Each UE in the plurality of UEs may use the common K1 to determine a timing resource in which to report a feedback codebook for a GC-PDSCH transmission associated with a respective GC-PDCCH transmission. For example, base station 105 may specify, in a first multicast transmission grant 510 of the plurality of multicast transmission grants, a common K1 that each of UE0-UE2 may use to determine that a feedback codebook for a first multicast transmission associated with first multicast transmission grant 510 is to be reported in resource 510 by each of UE0-UE2. In embodiments, resource 510 may be a slot and/or a sub-slot. In this case, each UE in the plurality of UEs may report the feedback codebook in the same slot/sub-slot. A such, the size of the feedback codebook transmitted in a PUCCH occasion for each of the UEs is the same.

In embodiments, in addition to the common K1 indication, the base station may include a plurality of PRI indications in each of the multiple GC-PDCCH transmission grants (such as in different fields of the GC-PDCCH transmission grants). In embodiments, each UE may be configured to monitor a different PRI field. In this manner, although the plurality of UEs is configured to report a feedback codebook for the GC-PDSCH transmission in the same slot/sub-slot, the feedback codebook report for each UE may be reported in a different resource of the same slot/sub-slot. For example, UE0 may transmit feedback codebook 550 in resource 560, UE1 may transmit feedback codebook 550 in resource 561, and UE2 may transmit feedback codebook 550 in resource 562. In this example, each of resources 560-562 is a different resource within slot/sub-slot 510.

In embodiments, a common counter DAI may be implemented. In particular, as the size of the feedback codebooks transmitted in each PUCCH occasion for the plurality of UEs is the same, a common counter DAI may be used. The common counter DAI may be reset when a new K1 timing across all UEs in the plurality of UEs is selected. In embodiments, the common counter DAI may be incremented for each GC-PDCCH in which the same K1 timing is used.

Figure 6:
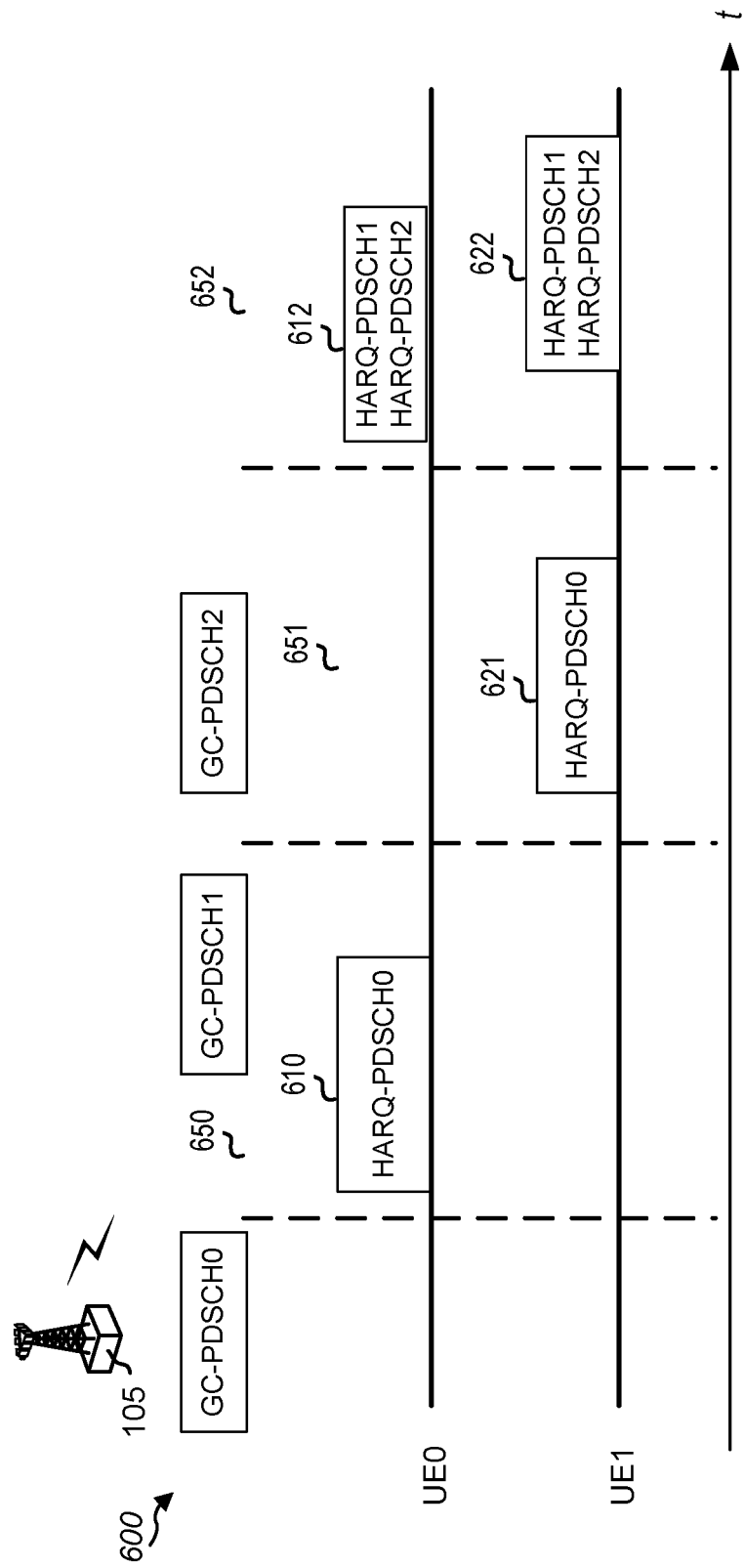
FIG. 6 is a timing diagram illustrating an example of reporting feedback transmissions for multicast transmissions reported based on scheduling restrictions according to some aspects of the present disclosure.

FIG. 6 is a timing diagram 600 illustrating an example of reporting feedback transmissions for multicast transmissions reported based on scheduling restrictions according to some aspects of the present disclosure. As illustrated, a base station (such as base station 105) may transmit a plurality of multicast transmission grants. For example, base station 105 may transmit multiple GC-PDCCH transmissions, each GC-PDCCH transmission granting a GC-PDSCH transmission (such as GC-PDSCH0, GC-PDSCH1, and GC-PDSCH2). In embodiments, the base station 105 may configure the GC-PDCCH transmission grants granting transmission of GC-PDSCH0, GC-PDSCH1, and GC-PDSCH2 to include K1s for each of the UE0 and UE1 that restrict the scheduling of the feedback codebook for each GC-PDSCH0, GC-PDSCH1, and GC-PDSCH2, such that each feedback codebook transmitted by UE0 and UE1 for each PUCCH occasion has the same size. For example, the UE0 and UE1 may be configured (such as by base station 105) to transmit, for the first PUCCH occasion, a feedback codebook that includes feedback (such as ACK/NACK) for a single GC-PDSCH transmission (such as GC-PDSCH0). For example, the base station 105 may configure the GC-PDCCH transmission granting GC-PDSCH0 to include a K1 that configures UE0 to transmit feedback (such as HARQ feedback) for GC-PDSCH0 in the first PUCCH occasion of UE0 at 650. In this example, the base station 105 may configure the GC-PDCCH transmission granting GC-PDSCH0 to include a K1 that configures UE1 to transmit feedback (such as HARQ feedback) for GC-PDSCH0 in the first PUCCH occasion of UE1 at 651. In this case, UE0 may transmit feedback codebook 610 for GC-PDSCH0 in PUCCH resource 650, and UE1 may transmit feedback codebook 621 for GC-PDSCH0 in PUCCH resource 651. In this case, both feedback codebooks 610 and 621, transmitted in the first PUCCH occasion of UE0 and UE1, may have the same size.

In this example, UE0 and UE1 may be configured (such as by base station 105) to transmit, for a second PUCCH occasion, a feedback codebook that includes feedback (such as ACK/NACK) for two GC-PDSCH transmissions (such as GC-PDSCH1 and GC-PDSCH2). In this case, UE0 may transmit feedback codebook 612 for GC-PDSCH1 and GC-PDSCH2 in PUCCH resource 652. Similarly, UE1 may transmit feedback codebook 622 for GC-PDSCH1 and GC-PDSCH2 in PUCCH resource 652. In this case, both feedback codebooks 612 and 622 may have the same size (such as may include feedback information for two GC-PDSCH transmissions).

Figure 7:
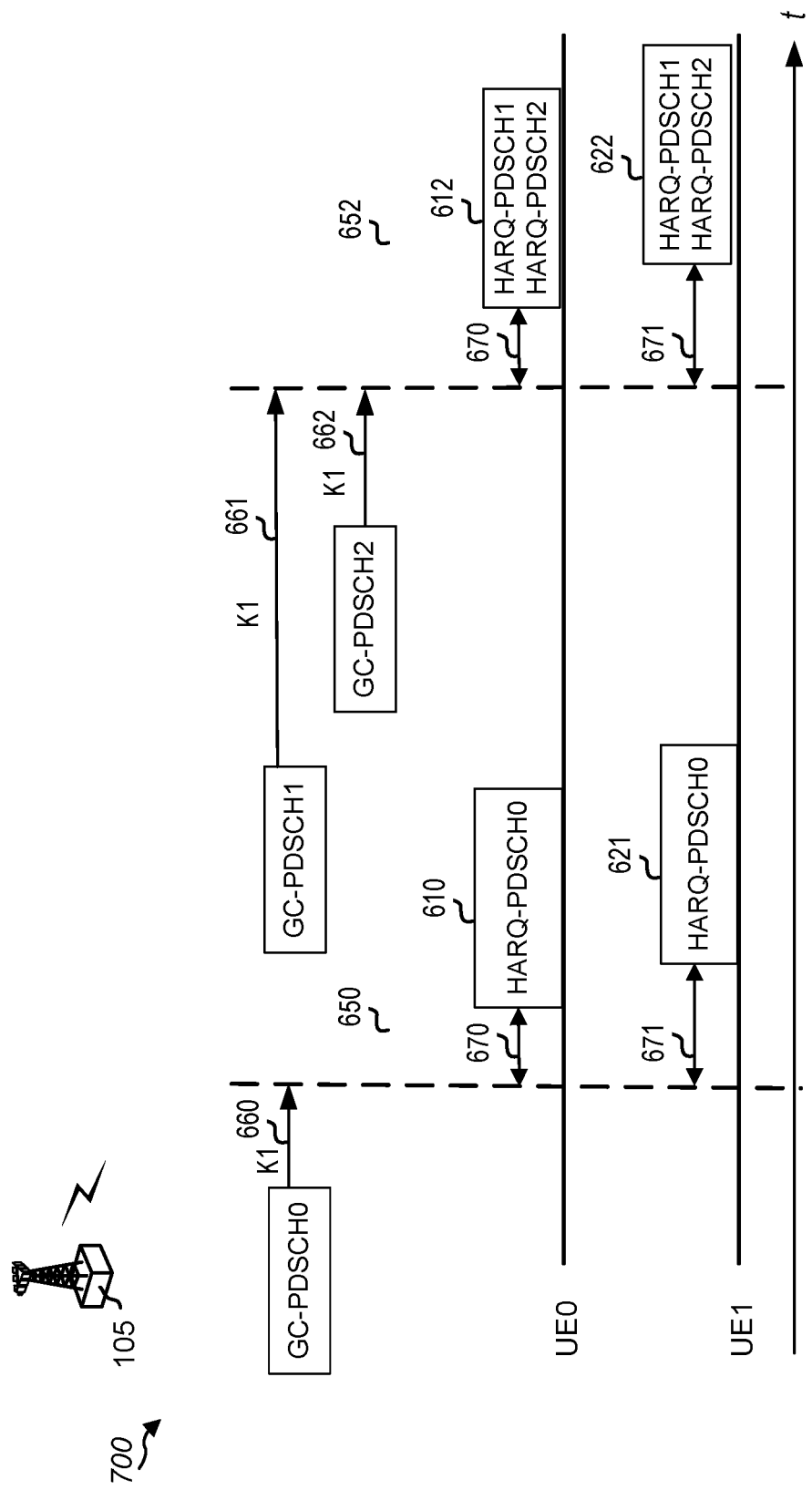
FIG. 7 is a timing diagram illustrating an example of transmitting feedback transmissions on resources determined based on relative K1s according to some aspects of the present disclosure.

FIG. 7 is a timing diagram 700 illustrating an example of transmitting feedback transmissions on resources determined based on relative K1s according to some aspects of the present disclosure. As noted above, UEs in an MBMS system may be configured with a relative K1 which may be used as a scheduling restriction, in order to ensure that each feedback codebook transmitted by a UE for each PUCCH occasion has the same size as the feedback codebook transmitted by another UE for the same PUCCH occasion, and to ensure that the PUCCH transmissions including the feedback codebooks are distributed over time. As shown in FIG. 7, base station 105 may transmit multiple GC-PDCCH transmissions, each GC-PDCCH transmission granting a GC-PDSCH transmission (such as GC-PDSCH0, GC-PDSCH1, and GC-PDSCH2). In embodiments, the base station 105 may include, in each of GC-PDCCH transmission grants granting transmission of GC-PDSCH0, GC-PDSCH1, and GC-PDSCH2, control information (such as a DCI message) indicating a K1 that a UE may use to determine a feedback resource for transmitting a feedback report for a respective GC-PDSCH transmission For example, base station 105 may include K1 660 in a GC-PDCCH transmission grant granting GC-PDSCH0 transmission, which a UE or UEs (such as UE0 and UE1) may use to determine that a feedback codebook including feedback for GC-PDSCH0 transmission is to be reported in PUCCH resource 650. Similarly, base station 105 may include, in a GC-PDCCH transmission grant granting GC-PDSCH1, K1 661, which a UE or UEs (such as UE0 and UE1) may use to determine that a feedback codebook including feedback for GC-PDSCH1 is to be reported in PUCCH resource 652. Additionally, base station 105 may include, in a GC-PDCCH transmission grant granting GC-PDSCH2, K1 662, which a UE or UEs (such as UE0 and UE1) may use to determine that a feedback codebook including feedback for GC-PDSCH2 is to be reported in PUCCH resource 652.

As also shown in FIG. 7, each of UE0 and UE1 may be configured with a relative K1. For example, UE0 may be configured with relative K1 670 and UE1 may be configured with relative K1 671. In embodiments, a UE may determine a resource for transmitting a feedback codebook to the base station based at least in part on the relative K1 and the indicated K1. In these embodiments, the UE may add the relative K1 to the indicated K1 to obtain a total K1. The UE may then use the total K1 to determine the feedback resource for reporting the feedback codebook to the base station. For example, in determining a resource for reporting feedback for GC-PDSCH0, UE0 may add relative K1 670 to K1 660. The result of the sum may be used by UE0 to determine the feedback resource in which to transmit feedback codebook 610 for GC-PDSCH0. UE1, in determining a resource for reporting feedback for GC-PDSCH0, may add relative K1 671 to K1 660. The result of the sum may be used by UE1 to determine the feedback resource in which to transmit feedback codebook 621 for GC-PDSCH0.

In the same example, in determining a resource for reporting feedback for GC-PDSCH1 and GC-PDSCH2, UE0 may add relative K1 670 to K1 661 and K1 662, respectively. The result of the sums may be used by UE0 to determine the feedback resource in which to transmit a feedback codebook for GC-PDSCH1 and GC-PDSCH2, respectively. In this case, as the feedback for GC-PDSCH1 and GC-PDSCH2 is to be reported in the same resource, the codebook reported by UE0 may include the feedback report for both GC-PDSCH1 and GC-PDSCH2. In this example, UE1 determines a resource for reporting feedback for GC-PDSCH1 and GC-PDSCH2 by adding relative K1 671 to K1 661 and K1 662, respectively. The result of the sums may be used by UE1 to determine the feedback resource in which to transmit a feedback codebook for GC-PDSCH1 and GC-PDSCH2, respectively. In this case, a feedback codebook including a feedback report for both GC-PDSCH1 and GC-PDSCH2 may be transmitted by UE1.

As will be appreciated, the feedback resource in which UE0 transmits transmit feedback codebook 610 for GC-PDSCH0 may be different than the feedback resource in which UE1 transmits transmit feedback codebook 621 for GC-PDSCH0, even though the indicated K1 660 is the same. In this example, without the relative K1 for each of UE0 and UE1, both UE0 and UE1 may determine the same feedback resource for transmitting feedback codebook for GC-PDSCH0. As such, configuring UEs in an MBMS system with relative K1s, as disclosed herein, enables the MBMS system to distribute the feedback reporting associated with GC-PDSCH transmissions over time in a fixed relative pattern.

FIG. 8 is a flow diagram illustrating an example process 800 that supports reporting of feedback for multicast transmissions according to some aspects of the present disclosure. Operations of the process 800 may be performed by a UE, such as the UE 115 described above with reference to FIGS. 1-7 or a UE as described with reference to FIG. 10. For example, example operations (also referred to as "blocks") of the process 800 may enable the UE 115 to perform feedback for multicast (such as MBMS) transmissions in accordance with aspects of the present disclosure.

In block 802, the UE 115 receives receiving a plurality of multicast transmission grants addressed to a plurality of UEs including the UE 115. For example, the UE 115 may receive multiple GC-PDCCH transmissions, each GC-PDCCH transmission granting a GC-PDSCH transmission. In embodiments, each of the multicast transmission grants may include at least one K1 and at least one PRI. The indicated K1 and PRI may be used by the UE for ACK/NACK feedback associated with a respective multicast transmission. In some embodiments, the indicated at least one K1 may include a common K1 that may be used by each UE in the plurality of UEs to determine a resource (such as a slot/sub-slot) for reporting the ACK/NACK feedback. In some embodiments, the indicated at least one K1 may include different K1s for different UEs of the plurality of UEs. In these cases, each UE of the plurality of UEs may be configured to monitor a different K1 field in the multicast transmission grant, and in some embodiments more than one UE may monitor the same K1 field.

In block 804, the UE 115 receives, from the base station, a first multicast transmission associated with a first multicast transmission grant of the plurality of multicast transmission grants. For example, the UE 115 may receive a first GC-PDSCH transmission associated with a first GC-PDCCH transmission grant.

In block 806, the first UE 115 determines a first feedback codebook for transmitting ACK/NACK feedback associated with the first multicast transmission to the base station. For example, the UE 115 may generate a feedback report for the first GC-PDSCH transmission. The generated feedback report may be used to generate the first feedback codebook to be reported.

In block 808, the first UE 115 determines a first feedback resource for transmitting the feedback codebook for the first multicast transmission to the base station based at least in part on a K1 and a PRI in the first multicast transmission grant. For example, the UE 115 may determine, based on the K1 and the PRI in the first GC-PDCCH transmission grant a first resource in a PUCCH for transmitting the feedback codebook associated with the first GC-PDSCH transmission.

In some implementations, the first feedback codebook may include additional feedback reports for other GC-PDSCH transmissions. For example, in some embodiments, the UE 115 may determine a feedback resource for reporting feedback for a second GC-PDSCH transmission and the feedback resource for the second GC-PDSCH transmission may be the same as the feedback resource for the first GC-PDSCH transmission. In this case, the feedback codebook may include a feedback report for both the first GC-PDSCH transmission and the second GC-PDSCH transmission.

In block 810, the first UE 115 transmits the first feedback codebook to the base station on the determined first feedback resource.

FIG. 9 is a flow diagram illustrating an example process 900 that supports management and control of feedback for multicast transmissions based on configuration of K1s and PRIs according to some aspects of the present disclosure. Operations of the process 900 may be performed by a base station, such as the base station 105 described above with reference to FIGS. 1-7 or a base station as described with reference to FIG. 11. For example, example operations of the process 900 may enable the base station 105 to control feedback for multicast (such as MBMS) transmissions in accordance with aspects of the present disclosure.

In block 902, the base station 105 transmits, to a plurality of UEs, a plurality of multicast transmission grants. For example, the base station 105 may transmit multiple GC-PDCCH transmissions, each GC-PDCCH transmission granting a GC-PDSCH transmission to the plurality of UEs. In embodiments, each of the multicast transmission grants may include at least one K1 and at least one PRI. The indicated K1 and PRI may be used by UEs in the plurality of UEs for ACK/NACK feedback associated with a respective multicast transmission. In some embodiments, the indicated at least one K1 may include a common K1 that may be used by each UE in the plurality of UEs to determine a resource (such as a slot/sub-slot) for reporting the ACK/NACK feedback. In some embodiments, the indicated at least one K1 may include different K1s for different UEs of the plurality of UEs. In these cases, each UE of the plurality of UEs may be configured to monitor a different K1 field in the multicast transmission grant, and in some embodiments more than one UE may monitor the same K1 field.

In block 904, the base station 105 transmits, to the plurality of UEs, a first multicast transmission associated with a first multicast transmission grant of the at least one multicast transmission grant. For example, the base station 105 may transmit a first GC-PDSCH transmission associated with a first GC-PDCCH transmission grant of the multiple GC-PDCCH transmission grants. In embodiments, the first GC-PDSCH transmission may be addressed to the plurality of UEs.

In block 906, the base station 105 receives at least one feedback codebook from at least one UE of the plurality of UEs, the at least one feedback codebook including ACK/NACK feedback associated with the first multicast transmission. For example, the base station 105 may receive a first feedback codebook from UE 115 including ACK/NACK feedback associated with the first multicast transmission. In some embodiments, the base station 105 may receive a second feedback codebook from another UE including ACK/NACK feedback associated with the first multicast transmission. In some embodiments, the first feedback codebook from UE 115 may additionally include ACK/NACK feedback for a second multicast transmission. For example, the base station 105 may transmit a second multicast transmission to the plurality of UEs. The UE 115 may generate ACK/NACK feedback for the second multicast transmission and may include the ACK/NACK feedback for the second multicast transmission in the first feedback codebook.

In some implementations, the feedback resource in which the feedback codebook for a GC-PDSCH transmission is transmitted from a UE may be determined, such as by the UE, based in part on the K1 and PRI indications in the GC-PDCCH transmission grant transmitted by the base station. Determination of the feedback resource may be in accordance with the discussion above with respect to FIG. 8.

Figure 10:
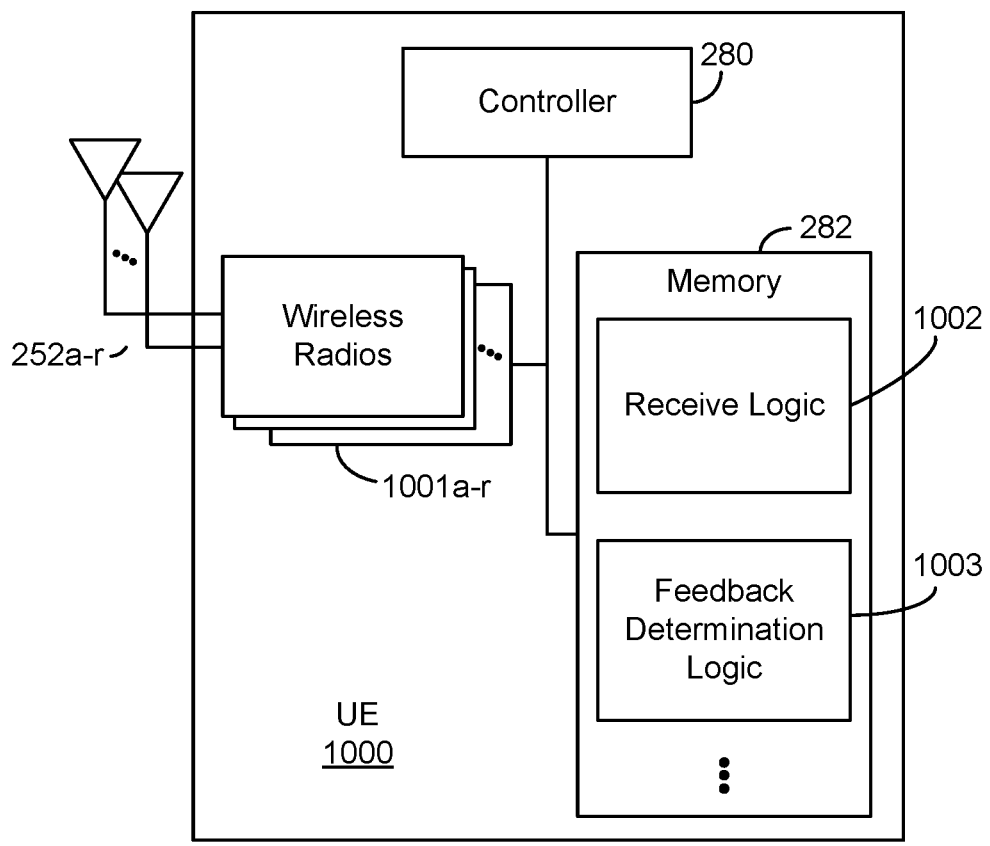
FIG. 10 is a block diagram of an example UE that supports reporting of feedback for multicast transmissions according to some aspects of the present disclosure.

FIG. 10 is a block diagram of an example UE 1000 that supports reporting of feedback for multicast transmissions according to some aspects of the present disclosure. The UE 1000 may be configured to perform operations, including the blocks of the process 800 described with reference to FIG. 8. In some implementations, the UE 1000 includes the structure, hardware, and components shown and described with reference to the UE 115 of FIG. 2 or 3. For example, the UE 1000 includes the controller 280, which operates to execute logic or computer instructions stored in the memory 282, as well as controlling the components of the UE 1000 that provide the features and functionality of the UE 1000. The UE 1000, under control of the controller 280, transmits and receives signals via wireless radios 1001$a$-$r$ and the antennas 252$a$-$r$. The wireless radios 1001$a$-$r$ include various components and hardware, as illustrated in FIG. 2 for the UE 115, including the modulator and demodulators 254$a$-$r$, the MIMO detector 256, the receive processor 258, the transmit processor 264, and the TX MIMO processor 266.

As shown, the memory 282 may include receive logic 1002 and feedback determination logic 1003. The receive logic 1002 may be configured to perform signal reception operations. The feedback determination logic 1003 may be configured to perform feedback codebook and resource determination operations in accordance with the present disclosure. The UE 1000 may receive signals from or transmit signals to one or more network entities, such as the base station 105 of FIGS. 1-7 or a base station as illustrated in FIG. 11.

In some implementations, the UE 1000 may be configured to perform the process 800 of FIG. 8. To illustrate, the UE 1000 may execute, under control of the controller 280, the receive logic 1002 and the feedback determination logic 1003 stored in the memory 282. The execution environment of the receive logic 1002 provides the functionality to perform at least the operations in block 802. The execution environment of the feedback determination logic 1003 provides the functionality to perform at least the operations in blocks 804-808.

Figure 11:
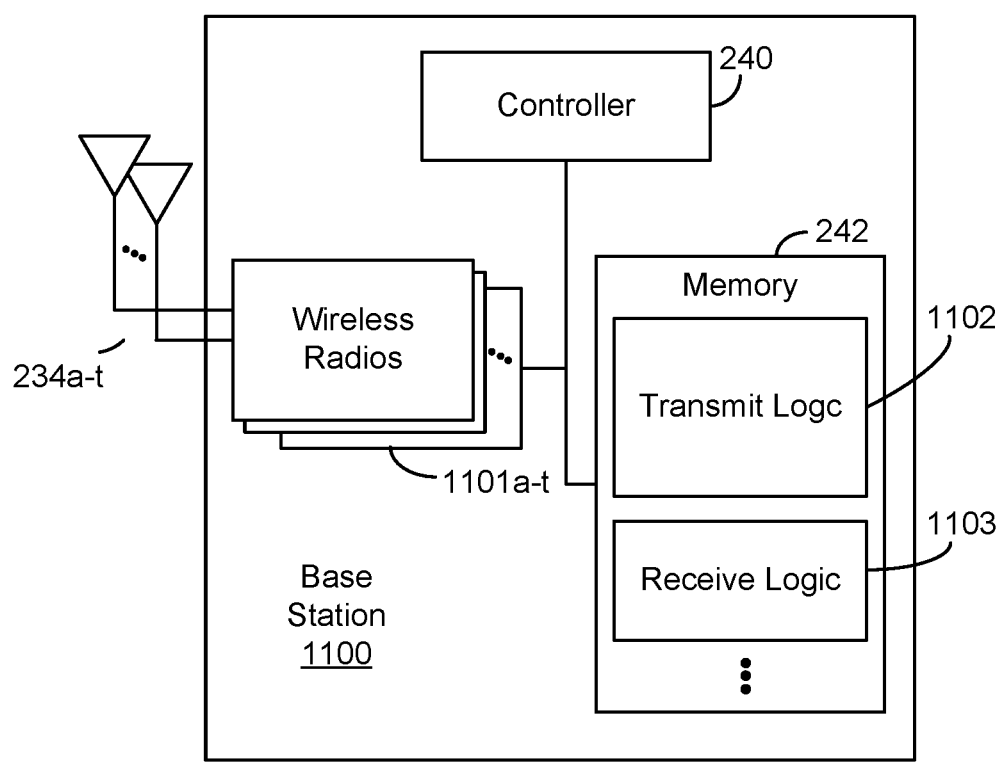
FIG. 11 is a block diagram of an example base station that supports management and control of feedback for multicast transmissions according to some aspects of the present disclosure.

FIG. 11 is a block diagram of an example base station 1100 that supports management and control of feedback for multicast transmissions according to some aspects of the present disclosure. The base station 1100 may be configured to perform operations, including the blocks of the process 900 described with reference to FIG. 9. In some implementations, the base station 1100 includes the structure, hardware, and components shown and described with reference to the base station 105 of FIGS. 1-7. For example, the base station 1100 may include the controller 240, which operates to execute logic or computer instructions stored in the memory 242, as well as controlling the components of the base station 1100 that provide the features and functionality of the base station 1100. The base station 1100, under control of the controller 240, transmits and receives signals via wireless radios 1101$a$-$t$ and the antennas 234$a$-$t$. The wireless radios 1101$a$-$t$ include various components and hardware, as illustrated in FIG. 2 for the base station 105, including the modulator and demodulators 232$a$-$t$, the transmit processor 220, the TX MIMO processor 230, the MIMO detector 236, and the receive processor 238.

As shown, the memory 242 may include transmit logic 1102 and receive logic 1103. The transmit logic 1102 may be configured to perform multicast transmission grant and multicast transmission transmitting operations. The receive logic 1103 may be configured to perform feedback reception operations. The base station 1100 may receive signals from or transmit signals to one or more UEs, such as the UE 115 of FIGS. 1-7 or the UE 1000 of FIG. 10.

In some implementations, the base station 1100 may be configured to perform the process 900 of FIG. 9. To illustrate, the base station 111 may execute, under control of the controller 240, the transmit logic 1102 and the receive logic 1103 stored in the memory 242. The execution environment of the transmit logic 1102 provides the functionality to perform at least the operations in block 902 and 904. The execution environment of the receive logic 1103 provides the functionality to perform at least the operations in block 906.

It is noted that one or more blocks (or operations) described with reference to FIGS. 8 and 9 may be combined with one or more blocks (or operations) described with reference to another of the figures. For example, one or more blocks (or operations) of FIG. 8 may be combined with one or more blocks (or operations) of FIG. 9. As another example, one or more blocks associated with FIG. 10 or 11 may be combined with one or more blocks (or operations) associated with FIG. 2 or 4.

In some aspects, techniques for enabling management and control of feedback reporting associated with broadcast or multicast transmissions may include additional aspects, such as any single aspect or any combination of aspects described below or in connection with one or more other processes or devices described elsewhere herein. In a first aspect, techniques for enabling management and control of feedback reporting associated with broadcast or multicast transmissions may include receiving, from a base station, a plurality of multicast transmission grants addressed to a plurality of UEs. Each of the multicast transmission grants schedules a multicast transmission and includes at least one K1 and at least one PRI for ACK/NACK feedback associated with a respective multicast transmission. The techniques in the first aspect may also include receiving, from the base station, a first multicast transmission associated with a first multicast transmission grant of the plurality of multicast transmission grants, determining a first feedback codebook for transmitting ACK/NACK feedback associated with the first multicast transmission to the base station, determining a first feedback resource for transmitting the first feedback codebook to the base station based at least in part on the at least one K1 and the at least one PRI in the first multicast transmission grant, and transmitting the first feedback codebook to the base station on the determined first feedback resource. In some examples, the techniques in the first aspect may be implemented in a method or process. In some examples, the techniques of the first aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a second aspect, alone or in combination with the first aspect, the at least one K1 in the first multicast transmission grant is a common K1 that is shared by each UE in the plurality of UEs, and the at least one PRI in the first multicast transmission grant includes a PRI associated with the UE.

In a third aspect, alone or in combination with one or more of the first through second aspects, the at least one PRI includes another PRI associated with another UE of the plurality of UEs, the other PRI being associated with the common K1 and different than the PRI associated with the UE.

In a fourth aspect, alone or in combination with one or more of the first through third aspects, determining the first feedback resource for transmitting the feedback codebook to the base station includes determining at least one of a slot or a subslot for transmitting the first feedback codebook based on the common K1 shared by each UE of the plurality of UEs.

In a fifth aspect, in combination with the fourth aspect, determining the first feedback resource for transmitting the feedback codebook to the base station includes determining a resource element of the slot or the subslot for transmitting the first feedback codebook based on the PRI associated with the UE.

In a sixth aspect, alone or in combination with the first aspect, the at least one K1 in the first multicast transmission grant includes a K1 associated with the UE and another K1 in the at least one K1 associated with another UE of the plurality of UEs, the other K1 being different than the K1.

In a seventh aspect, alone or in combination with one or more of the first and sixth aspects, determining the first feedback codebook including the ACK/NACK feedback of the first multicast transmission for reporting to the base station includes determining, based on a scheduling restriction, the first feedback codebook having a same structure as a second feedback codebook of the other UE, the scheduling restriction limiting scheduling of ACK/NACK feedback in a same PUCCH occasion for different UEs such that a feedback codebook associated with the limited ACK/NACK feedback has a same size for the different UEs.

In an eighth aspect, alone or in combination with the first aspect, determining the first feedback resource for transmitting the feedback codebook to the base station includes adding a relative K1 associated with the UE to the at least one K1 in the first multicast transmission grant to generate a total K1 associated with the UE.

In a ninth aspect, in combination with the eighth aspect, determining the first feedback resource for transmitting the feedback codebook to the base station includes determining at least one of a slot or a subslot for transmitting the first feedback codebook based on the total K1 associated with the UE.

In a tenth aspect, alone or in combination with one or more of the first, eighth and ninth aspects, each UE in the plurality of UEs is configured with a respective relative K1 to be added to the at least one K1 in the first multicast grant to determine a feedback resource for respectively reporting ACK/NACK feedback for the first multicast transmission.

In an eleventh aspect, alone or in combination with one or more of the first and eighth through tenth aspects, the at least one PRI in the first multicast transmission grant includes a PRI associated with the UE and another PRI associated with another UE of the plurality of UEs, the other PRI being different than the PRI associated with the UE.

In a twelfth aspect, alone or in combination with one or more of the first and eighth through eleventh aspects, the PRI associated with the UE is associated with the total K1 of the UE, and the other PRI associated with the other UE is associated with a total K1 of the other UE, the total K1 of the other UE obtained by adding a relative K1 associated with the other UE and the at least one K1.

In a thirteenth aspect, alone or in combination with one or more of the first and eighth through twelfth aspects, the at least one PRI in the first multicast transmission grant includes a PRI associated with the UE and another PRI associated with another UE of the plurality of UEs, the other PRI being different than the PRI associated with the UE.

In a fourteenth aspect, alone or in combination with one or more of the first through thirteenth aspects, the multicast transmission is an MBMS transmission over a PDSCH.

In a fifteenth aspect, alone or in combination with one or more of the first through fourteenth aspects, each multicast transmission grant of the plurality of multicast transmission grants is received in a respective DCI message of a GC-PDCCH transmission.

In a sixteenth aspect, techniques for enabling management and control of feedback reporting associated with broadcast or multicast transmissions may include transmitting, to a plurality of UEs, a plurality of multicast transmission grants. Each of the multicast transmission grants schedules a multicast transmission and includes at least one K1 and at least one PRI for ACK/NACK feedback associated with a respective multicast transmission. The techniques in the sixteenth aspect may also include transmitting, to the plurality of UEs, a first multicast transmission associated with a first multicast transmission grant of the at least one multicast transmission grant, and receiving at least one feedback codebook from at least one UE of the plurality of UEs. The at least one feedback codebook includes ACK/NACK feedback associated with the first multicast transmission. In some examples, the techniques in the sixteenth aspect may be implemented in a method or process. In some examples, the techniques of the sixteenth aspect may be implemented in a wireless communication device such as a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a seventeenth aspect, in combination with sixteenth aspect, the at least one K1 in the first multicast transmission grant is a common K1 that is shared by each UE in the plurality of UEs, and each PRI of the at least one PRI in the first multicast transmission grant is associated with a respective UE. Each PRI of the at least one PRI is different than each other PRI of the at least one PRI.

In an eighteenth aspect, alone or in combination with the sixteenth and seventeenth aspect, receiving the at least one feedback codebook from the at least one UE of the plurality of UEs includes receiving a first feedback codebook report from a first UE of the plurality of UEs, the first feedback codebook report received in a first resource element of a first slot.

In a nineteenth aspect, in combination with the eighteenth aspect, receiving the at least one feedback codebook from the at least one UE of the plurality of UEs includes receiving a second feedback codebook report from a second UE of the plurality of UEs, the second feedback codebook report received in a second resource element of the first slot. The second resource element is different than the first resource element In a twentieth aspect, alone or in combination with one or more of the sixteenth through nineteenth aspects, the techniques of the sixteenth aspect include configuring each multicast transmission grant of the plurality of multicast transmission grants to include a common counter DAI to indicate a number of multicast transmission grants configured to cause each UE of the plurality of UEs to transmit, based on the common K1, a feedback codebook associated with the multicast transmission grants in a same PUCCH occasion.

In a twenty-first aspect, alone or in combination with one or more of the sixteenth through twentieth aspects, the techniques of the sixteenth aspect include configuring the common K1 of the first multicast transmission grant to cause each UE of the plurality of UEs to transmit a feedback codebook associated with the first multicast transmission grant in a first PUCCH occasion.

In a twenty-second aspect, in combination with the twenty-first aspect, the techniques of the sixteenth aspect include incrementing, in response to configuring the common K1 of the first multicast transmission grant to cause each UE of the plurality of UEs to transmit the feedback codebook associated with the first multicast transmission grant in the first PUCCH occasion, the common DAI counter.

In a twenty-third aspect, alone or in combination with one or more of the sixteenth through twenty-second aspects, the techniques of the sixteenth aspect include configuring the common K1 of a second multicast transmission grant to cause each UE of the plurality of UEs to transmit a feedback codebook associated with the second multicast transmission grant in the first PUCCH occasion.

In a twenty-fourth aspect, in combination with the twenty-third aspect, the techniques of the sixteenth aspect include incrementing, in response to configuring the common K1 of the second multicast transmission grant to cause each UE of the plurality of UEs to transmit the feedback codebook associated with the second multicast transmission grant in the first PUCCH occasion, the common DAI counter.

In a twenty-fifth aspect, alone or in combination with one or more of the sixteenth through twenty-second aspects, the techniques of the sixteenth aspect include configuring the common K1 of a second multicast transmission grant to cause each UE of the plurality of UEs to transmit a feedback codebook associated with the second multicast transmission grant in a second PUCCH occasion different than the first PUCCH occasion.

In a twenty-sixth aspect, in combination with the twenty-fifth aspect, the techniques of the sixteenth aspect include resetting, in response to configuring the common K1 of the second multicast transmission grant to cause each UE of the plurality of UEs to transmit the feedback codebook associated with the second multicast transmission grant in the second PUCCH occasion, the common DAI counter.

In a twenty-seventh aspect, in combination with sixteenth aspect, the techniques of the sixteenth aspect include configuring a scheduling restriction for each UE in the plurality of UEs, the scheduling restriction limiting scheduling of ACK/NACK feedback in a same PUCCH occasion for different UEs such that a feedback codebook associated with the limited ACK/NACK feedback has a same size for the different UEs.

In a twenty-eighth aspect, alone or in combination with one or more of the sixteenth and twenty-seventh aspect, receiving the at least one feedback codebook from the at least one UE of the plurality of UEs includes receiving a first feedback codebook report associated with the first multicast transmission from a first UE of the plurality of UEs, the first feedback codebook report received in a first slot.

In a twenty-ninth aspect, in combination with the twenty-eighth aspect, receiving the at least one feedback codebook from the at least one UE of the plurality of UEs includes receiving a second feedback codebook report associated with the first multicast transmission from a second UE of the plurality of UEs, the second feedback codebook report received in the first slot, a structure of the first feedback codebook being the same as the structure of the second feedback codebook.

In a thirtieth aspect, alone or in combination with one or more of the sixteenth and twenty-seven through twenty-ninth aspects, the techniques of the sixteenth aspect include transmitting, by the base station, a second multicast transmission associated with a second multicast transmission grant of the at least one multicast transmission grant. The first feedback codebook report is additionally associated with the second multicast transmission, and the second feedback codebook report is additionally associated with the second multicast transmission.

In a thirty-first aspect, alone or in combination with one or more of the sixteenth and twenty-seven through thirtieth aspects, the techniques of the sixteenth aspect include configuring each UE in the plurality of UEs with a respective relative K1 to be added to the at least one K1 in each multicast transmission grant of the at least one multicast transmission grant to facilitate determining a feedback resource for transmitting ACK/NACK feedback for a respective multicast grant.

In a thirty-second aspect, in combination with the sixteenth aspect, the techniques of the sixteenth aspect include configuring each UE in the plurality of UEs with a respective relative K1 causes each UE to add the relative K1 to the at least one K1 indicated in each multicast transmission grant to generate a total K1 associated with each UE.

In a thirty-third aspect, in combination with the thirty-second aspect, configuring each UE in the plurality of UEs with a respective relative K1 causes each UE to determine at least one of a slot or a subslot for transmitting a feedback codebook associated with each multicast transmission grant based on the total K1 associated with each UE.

In a thirty-fourth aspect, alone or in combination with one or more of the sixteenth through thirty-third aspects, the multicast transmission is an MBMS transmission over a PDSCH.

In a thirty-fifth aspect, alone or in combination with one or more of the sixteenth through thirty-fourth aspects, each multicast transmission grant of the plurality of multicast transmission grants is received in a respective DCI message of a GC-PDCCH transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) comprising:
   at least one processor; and
   a memory coupled with the at least one processor and storing processor-readable code that, when executed by the at least one processor, is configured to:
   receive, from a network entity, a plurality of multicast transmission grants, addressed to a plurality of UEs including the UE, that respectively schedule a plurality of multicast transmissions, including a first multicast transmission grant that schedules a first multicast transmission, each of the multicast transmission grants including a respective common feedback timing indicator (K1) and a respective plurality of physical uplink control channel (PUCCH) resource indicators (PRIs) for acknowledgement/negative-acknowledgement (ACK/NACK) feedback associated with the respective multicast transmission associated with the multicast transmission grant, the common K1 being shared by the plurality of UEs, each PRI of the plurality of PRIs being associated with a respective UE of the plurality of UEs;
   receive, from the network entity, the first multicast transmission in accordance with the first multicast transmission grant; and transmit, to the network entity on a first feedback resource associated with the common K1 and the respective PRI associated with the UE in the first multicast transmission grant, a first feedback codebook carrying ACK/NACK feedback associated with the first multicast transmission to the base station.

2. The UE of claim 1, wherein determining the first feedback resource for transmitting the feedback codebook to the network entity includes:
determining at least one of a slot or a subslot for transmitting the first feedback codebook based on the common K1 shared by each UE of the plurality of UEs; and
determining a resource element of the slot or the subslot for transmitting the first feedback codebook based on the PRI associated with the UE.

3. The UE of claim 1, wherein determining the first feedback resource for transmitting the feedback codebook to the network entity includes:
adding a relative K1 associated with the UE to the common K1 in the first multicast transmission grant to generate a total K1 associated with the UE; and
determining at least one of a slot or a subslot for transmitting the first feedback codebook based on the total K1 associated with the UE.

4. The UE of claim 3, wherein each UE in the plurality of UEs is configured with a respective relative K1 to be added to the common K1 in the first multicast grant to determine a feedback resource for respectively reporting ACK/NACK feedback for the first multicast transmission.

5. A network entity comprising:
at least one processor; and
a memory coupled with the at least one processor and storing processor-readable code that, when executed by the at least one processor, is configured to:
transmit, to a plurality of user equipments (UEs), a plurality of multicast transmission grants that respectively schedule a plurality of multicast transmissions, including a first multicast transmission grant that schedules a first multicast transmission, each of the multicast transmission grants including a respective common feedback timing indicator (K1) and a respective plurality of physical uplink control channel (PUCCH) resource indicators (PRIs) for acknowledgement/negative-acknowledgement (ACK/NACK) feedback associated with the respective multicast transmission associated with the multicast transmission grant, the common K1 being shared by the plurality of UEs, each PRI of the plurality of PRIs being associated with a respective UE of the plurality of UEs;
transmit, to the plurality of UEs, the first multicast transmission in accordance with the first multicast transmission grant; and
receive, from a first UE of the plurality of UEs, on a first feedback resource associated with the common K1 and the respective PRI associated with the first UE in the first multicast transmission grant, a first feedback codebook including ACK/NACK feedback associated with the first multicast transmission.

6. The network entity of claim 5, wherein the first feedback resource includes
a first resource element of a first slot, and wherein the at least one processor is further configured to receive a second feedback codebook from a second UE of the plurality of UEs, the second feedback codebook being received in a different second resource element of the first slot, the second resource element being associated with the common K1 and the respective PRI associated with the second UE.

7. The network entity of claim 5, wherein the at least one processor is further configured to:
configure each multicast transmission grant of the plurality of multicast transmission grants to include a common counter downlink assignment index (DAI) to indicate a number of multicast transmission grants configured to cause each UE of the plurality of UEs to transmit, based on the common K1, a feedback codebook associated with the multicast transmission grants in a same physical uplink control channel (PUCCH) occasion.

8. The network entity of claim 7, wherein the at least one processor is further configured to:
configure the common K1 of the first multicast transmission grant to cause each UE of the plurality of UEs to transmit a feedback codebook associated with the first multicast transmission grant in a first PUCCH occasion; and
increment, in response to configuring the common K1 of the first multicast transmission grant to cause each UE of the plurality of UEs to transmit the feedback codebook associated with the first multicast transmission grant in the first PUCCH occasion, the common DAI counter.

9. The network entity of claim 8, wherein the at least one processor is further configured to:
configure the common K1 of a second multicast transmission grant to cause each UE of the plurality of UEs to transmit a feedback codebook associated with the second multicast transmission grant in the first PUCCH occasion; and
increment, in response to configuring the common K1 of the second multicast transmission grant to cause each UE of the plurality of UEs to transmit the feedback codebook associated with the second multicast transmission grant in the first PUCCH occasion, the common DAI counter.

10. The network entity of claim 9, wherein the at least one processor is further configured to:
configure the common K1 of a second multicast transmission grant to cause each UE of the plurality of UEs to transmit a feedback codebook associated with the second multicast transmission grant in a second PUCCH occasion different than the first PUCCH occasion; and
reset, in response to configuring the common K1 of the second multicast transmission grant to cause each UE of the plurality of UEs to transmit the feedback codebook associated with the second multicast transmission grant in the second PUCCH occasion, the common DAI counter.

11. The network entity of claim 5, wherein the at least one processor is further configured to:
configure a scheduling restriction for each UE in the plurality of UEs, the scheduling restriction limiting scheduling of ACK/NACK feedback in a same physical uplink control channel (PUCCH) occasion for different UEs such that a feedback codebook associated with the limited ACK/NACK feedback has a same size for the different UEs.

12. The network entity of claim 11, wherein the first feedback resource is
in a first slot, and wherein the at least one processor is further configured to receive a second feedback codebook associated with the first multicast transmission from a second UE of the plurality of UEs, the second feedback codebook being received in the first slot, a structure of the first feedback codebook being the same as the structure of the second feedback codebook.

13. The network entity of claim 12, wherein the at least one processor is further configured to:
transmit, by the base station, a second multicast transmission associated with a second multicast transmission grant of the plurality of multicast transmission grants, and wherein the first feedback codebook is additionally associated with the second multicast transmission, and wherein the second feedback codebook is additionally associated with the second multicast transmission.

14. The network entity of claim 5, wherein the at least one processor is further configured to:
configure each UE in the plurality of UEs with a respective relative K1 to be added to the common K1 in each multicast transmission grant of the plurality of multicast transmission grants to facilitate determining a respective feedback resource for transmitting ACK/NACK feedback for a respective multicast transmission.

15. The network entity of claim 14, wherein configuring each UE in the plurality of UEs with a respective relative K1 causes each UE to:
add the respective relative K1 to the common K1 indicated in each multicast transmission grant to generate a respective total K1 associated with each UE; and
determine at least one of a respective slot or a respective subslot for transmitting a respective feedback codebook associated with each multicast transmission grant based on the respective total K1 associated with each UE.

16. A method for wireless communication performed by a user equipment (UE), the method comprising:
receiving, from a network entity, a plurality of multicast transmission grants, addressed to a plurality of UEs including the UE, that respectively schedule a plurality of multicast transmissions, including a first multicast transmission grant that schedules a first multicast transmission, each of the multicast transmission grants including a respective common feedback timing indicator (K1) and a respective plurality of physical uplink control channel (PUCCH) resource indicators (PRIs) for acknowledgement/negative-acknowledgement (ACK/NACK) feedback associated with the respective multicast transmission associated with the multicast transmission grant, the common K1 being shared by the plurality of UEs, each PRI of the plurality of PRIs being associated with a respective UE of the plurality of UEs;
receiving, from the network entity, the first multicast transmission in accordance with the first multicast transmission grant; and
transmitting, to the network entity on a first feedback resource associated with the common K1 and the respective PRI associated with the UE in the first multicast transmission grant, a first feedback codebook carrying ACK/NACK feedback associated with the first multicast transmission to the base station.

17. The method of claim 16, wherein determining the first feedback resource for transmitting the feedback codebook to the network entity includes:
determining at least one of a slot or a subslot for transmitting the first feedback codebook based on the common K1 shared by each UE of the plurality of UEs; and
determining a resource element of the slot or the subslot for transmitting the first feedback codebook based on the PRI associated with the UE.

18. The method of claim 16, wherein determining the first feedback resource for transmitting the feedback codebook to the network entity includes:
adding a relative K1 associated with the UE to the common K1 in the first multicast transmission grant to generate a total K1 associated with the UE; and
determining at least one of a slot or a subslot for transmitting the first feedback codebook based on the total K1 associated with the UE.

19. The method of claim 18, wherein each UE in the plurality of UEs is configured with a respective relative K1 to be added to the common K1 in the first multicast grant to determine a feedback resource for respectively reporting ACK/NACK feedback for the first multicast transmission.

20. A method for wireless communication performed by a network entity, the method comprising:
transmitting, to a plurality of user equipments (UEs), a plurality of multicast transmission grants that respectively schedule a plurality of multicast transmissions, including a first multicast transmission grant that schedules a first multicast transmission, each of the multicast transmission grants including a respective common feedback timing indicator (K1) and a respective plurality of physical uplink control channel (PUCCH) resource indicators (PRIs) for acknowledgement/negative-acknowledgement (ACK/NACK) feedback associated with the respective multicast transmission associated with the multicast transmission grant, the common K1 being shared by the plurality of UEs, each PRI of the plurality of PRIs being associated with a respective UE of the plurality of UEs;
transmitting, to the plurality of UEs, the first multicast transmission in accordance with the first multicast transmission grant; and
receiving, from a first UE of the plurality of UEs, on a first feedback resource associated with the common K1 and the respective PRI associated with the first UE in the first multicast transmission grant, a first feedback codebook including ACK/NACK feedback associated with the first multicast transmission.

21. The method of claim 20, wherein the first feedback resource includes a first resource element of a first slot, and wherein the method further includes receiving a second feedback codebook from a second UE of the plurality of UEs, the second feedback codebook being received in a different second resource element of the first slot, the second resource element being associated with the common K1 and the respective PRI associated with the second UE.

22. The method of claim 20, further comprising configuring each multicast transmission grant of the plurality of multicast transmission grants to include a common counter downlink assignment index (DAI) to indicate a number of multicast transmission grants configured to cause each UE of the plurality of UEs to transmit, based on the common K1, a feedback codebook associated with the multicast transmission grants in a same physical uplink control channel (PUCCH) occasion.

23. The method of claim 22, further comprising:
configuring the common K1 of the first multicast transmission grant to cause each UE of the plurality of UEs to transmit a feedback codebook associated with the first multicast transmission grant in a first PUCCH occasion; and incrementing, in response to configuring the common K1 of the first multicast transmission grant to cause each UE of the plurality of UEs to transmit the feedback codebook associated with the first multicast transmission grant in the first PUCCH occasion, the common DAI counter.

24. The method of claim 23, further comprising:
configuring the common K1 of a second multicast transmission grant to cause each UE of the plurality of UEs to transmit a feedback codebook associated with the second multicast transmission grant in the first PUCCH occasion; and
incrementing, in response to configuring the common K1 of the second multicast transmission grant to cause each UE of the plurality of UEs to transmit the feedback codebook associated with the second multicast transmission grant in the first PUCCH occasion, the common DAI counter.

25. The method of claim 24, further comprising:
configuring the common K1 of a second multicast transmission grant to cause each UE of the plurality of UEs to transmit a feedback codebook associated with the second multicast transmission grant in a second PUCCH occasion different than the first PUCCH occasion; and
resetting, in response to configuring the common K1 of the second multicast transmission grant to cause each UE of the plurality of UEs to transmit the feedback codebook associated with the second multicast transmission grant in the second PUCCH occasion, the common DAI counter.

26. The method of claim 20, further comprising configuring a scheduling restriction for each UE in the plurality of UEs, the scheduling restriction limiting scheduling of ACK/NACK feedback in a same physical uplink control channel (PUCCH) occasion for different UEs such that a feedback codebook associated with the limited ACK/NACK feedback has a same size for the different UEs.

27. The method of claim 26, wherein the first feedback resource is in a first slot, and wherein the method further comprises receiving a second feedback codebook associated with the first multicast transmission from a second UE of the plurality of UEs, the second feedback codebook being received in the first slot, a structure of the first feedback codebook being the same as the structure of the second feedback codebook.

28. The method of claim 27, further comprising transmitting, by the base station, a second multicast transmission associated with a second multicast transmission grant of the plurality of multicast transmission grants, and wherein the first feedback codebook is additionally associated with the second multicast transmission, and wherein the second feedback codebook is additionally associated with the second multicast transmission.

29. The method of claim 20, further comprising configuring each UE in the plurality of UEs with a respective relative K1 to be added to the common K1 in each multicast transmission grant of the plurality of multicast transmission grants to facilitate determining a respective feedback resource for transmitting ACK/NACK feedback for a respective multicast transmission.

30. The method of claim 29, wherein configuring each UE in the plurality of UEs with a respective relative K1 causes each UE to:
add the respective relative K1 to the common K1 indicated in each multicast transmission grant to generate a respective total K1 associated with each UE; and
determine at least one of a respective slot or a respective subslot for transmitting a respective feedback codebook associated with each multicast transmission grant based on the respective total K1 associated with each UE.

* * * * *